United States Patent
Chatterjee et al.

(10) Patent No.: US 12,041,695 B2
(45) Date of Patent: Jul. 16, 2024

(54) DETERMINING AND COMMUNICATING CONTROL INFORMATION IN WIRELESS TELECOMMUNICATION NETWORKS

(71) Applicant: Apple Inc., Cupertino, CA (US)

(72) Inventors: Debdeep Chatterjee, San Jose, CA (US); Gang Xiong, Portland, OR (US); Hong He, Sunnyvale, CA (US); Yongjun Kwak, Portland, OR (US); Alexei Davydov, Nizhny Novgorod (RU); Hwan-Joon Kwon, Portland, OR (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/894,410

(22) Filed: Aug. 24, 2022

(65) Prior Publication Data

US 2023/0117785 A1 Apr. 20, 2023

Related U.S. Application Data

(63) Continuation of application No. 16/638,333, filed as application No. PCT/US2018/045999 on Aug. 9, 2018, now Pat. No. 11,457,510.

(Continued)

(51) Int. Cl.
*H04W 88/06* (2009.01)
*H04L 5/00* (2006.01)
(Continued)

(52) U.S. Cl.
CPC ........... *H04W 88/06* (2013.01); *H04L 5/0092* (2013.01); *H04L 5/0094* (2013.01); *H04W 24/08* (2013.01);
(Continued)

(58) Field of Classification Search
CPC . H04W 72/23; H04W 72/0446; H04W 24/08; H04W 88/06; H04W 88/08; H04L 5/0094; H04L 5/0092; H04L 5/0053
See application file for complete search history.

(56) References Cited

U.S. PATENT DOCUMENTS 11,457,510 B2 * 9/2022 Chatterjee ......... H04W 72/0446
2010/0159990 A1 6/2010 Johnstone
(Continued)

FOREIGN PATENT DOCUMENTS

WO 2016/114560 A1 7/2016

OTHER PUBLICATIONS

International Search Report dated Jan. 16, 2019 for International Application No. PCT/US2018/045999.
(Continued)

*Primary Examiner* — Mohammad S Anwar
*Assistant Examiner* — Kenneth P Hunt
(74) *Attorney, Agent, or Firm* — Eschweiler & Potashnik, LLC

(57) ABSTRACT

A user equipment (UE) may include one or more processors that are configured to cause UE capability information to be communicated to a radio access network (RAN) node, regarding a maximum number of blind decode attempts (BDAs) supported by the UE. The one or more processors are configured to determine, based on the maximum BDAs, shortened channel control elements (sCCEs) to be used, by the RAN node, to transmit shortened downlink control information (sDCI) via a shortened physical downlink control channel (sPDCCH) and obtain sDCI by monitoring the sPDCCH in accordance with the determined sCCEs.

20 Claims, 19 Drawing Sheets

Related U.S. Application Data

(60) Provisional application No. 62/544,505, filed on Aug. 11, 2017, provisional application No. 62/547,380, filed on Aug. 18, 2017.

(51) Int. Cl.
   *H04W 24/08* (2009.01)
   *H04W 72/0446* (2023.01)
   *H04W 72/23* (2023.01)
   *H04W 80/08* (2009.01)

(52) U.S. Cl.
   CPC ....... *H04W 72/0446* (2013.01); *H04W 72/23* (2023.01); *H04W 80/08* (2013.01)

(56) References Cited

U.S. PATENT DOCUMENTS

| | | | |
|---|---|---|---|
| 2018/0020443 A1* | 1/2018 | Lee | H04W 72/21 |
| 2018/0049203 A1 | 2/2018 | Xue | |
| 2018/0376476 A1 | 12/2018 | Lee | |
| 2019/0223204 A1* | 7/2019 | Kim | H04L 5/0053 |
| 2019/0245648 A1 | 8/2019 | Jo | |
| 2019/0281499 A1* | 9/2019 | Larsson | H04W 28/16 |
| 2020/0127760 A1 | 4/2020 | Jo | |
| 2020/0275417 A1 | 8/2020 | Takeda | |
| 2020/0314747 A1 | 10/2020 | Zhou | |
| 2021/0227511 A1* | 7/2021 | Solano Arenas | H04L 5/0082 |
| 2021/0250928 A1 | 8/2021 | Seo | |

OTHER PUBLICATIONS

"Contents of the group-common PDCCH." Source: CATT. Agenda Item: 5.1.3.1.4.2. 3GPP TSG RAN WG1 Meeting #AH_NR2, Qingdao, P.R. China, Jun. 27-30, 2017. R1-1710081. 2 pages.

"Discussion on the contents of group common PDCCH." Source: LG Electronics. Agenda Item: 5.1.3.1.4.2. 3GPP TSG RAN WG1 NR Ad Hoc #2, Qingdao, China Jun. 27-30, 2017. R1-1710310. 3 pages.

"Configuration and monitoring of the group-common PDCCH." Source: CATT. Agenda Item: 5.1.3.1.4.3. 3GPP TSG RAN WG1 Meeting #AH_NR2, Qingdao, P.R. China, Jun. 27-30, 2017. R1-1710082. 3 pages.

International Preliminary Report on Patentability dated Feb. 11, 2020 for International Application No. PCT/US2018/045999.

Downlink; 3GPP TS 36.211 V14.3.0; Release 14; Jun. 2017; p. 76-154.

Technical Specification; 3GPP TS 38.213 V0.0.1, 3rd Generation Partnership Project; Technical Specification Group Radio Access Network; NR; Physical layer procedures for control; (Release 15) Jul. 2017, p. 1-13.

3rd Generation Partnership Project; Technical Specification Group Radio Access Network; NR; Multiplexing and channel coding (Release 15); 3GPP TS 38.212 V0.0.0; May 2017.

3rd Generation Partnership Project; Technical Specification Group Radio Access Network; NR; Radio Resource Control (RRC); Protocol specification (Release 15 ); 3GPP TS 38.331 V0.0.5; Aug. 2017; https://www.3gpp.org/ftp/TSG_RAN/WG1_RL1/TSGR1_AH/NR_AH_1706/Docs/R1-1710082.zip (Year:2017).

CATT "R1-1710082 Configuration and monitoring of the group-common PDCCH" Jun. 17, 2017.

Non-Final Office Action dated Jan. 18, 2022 in connection with U.S. Appl. No. 16/638,333.

Notice of Allowance dated May 20, 2022 in connection with U.S. Appl. No. 16/638,333.

Random access procedure; 3GPP TS 36.213 V13.6.0 (Jun. 2017); Release 13.

3rd Generation Partnership Project; Technical Specification Group Radio Access Network; Evolved Universal Terrestrial Radio Access (E-UTRA); User Equipment (UE) radio access capabilities (Release 14); 3GPP TS 36.306 V14.3.0 (Jun. 2017).

ZTE; "Search Space for sTTI Operation"; 3GPP Draft; R1-1707277; vol. RAN WG1 Meeting #89; May 14, 2017.

EP Extended Search Report mailed Nov. 22, 2022 in connection with Application No. 22202533.0.

Nokia, Alcatel-Lucent Shanghai Bell; "Resource sharing between PDCCH and PDSCH in NR"; 3GPP TSG-RAN WG1 Ad Hoc Meeting #2; Ri-1710983; Jun. 27, 2017.

\* cited by examiner

DETERMINING AND COMMUNICATING CONTROL INFORMATION IN WIRELESS TELECOMMUNICATION NETWORKS

RELATED APPLICATIONS

This application is a continuation of U.S. application Ser. No. 16/638,333 filed Feb. 11, 2020, which is a National Phase entry application of International Patent Application No. PCT/US2018/045999 filed on Aug. 9, 2018 which claims priority to Application No. 62/544,505, which was filed on Aug. 11, 2017, and of U.S. Provisional Patent Application No. 62/547,380, which was filed on Aug. 18, 2017, the contents of which are hereby incorporated by reference as though fully set forth herein.

BACKGROUND

Wireless telecommunication networks may include user equipment (UE) (e.g., smartphones, tablet computers, laptop computers, etc.) radio access networks (RANs) (that often include one or more base stations), and a core network. A UE may connect to the core network by communicating with the RAN and registering with the core network. Communications between the UE and the RAN may occur over one or more wireless channels.

In some scenarios, a wireless telecommunication network may provide control channel information to UEs. In general, such information may inform the UEs how the network is to transmit information to the UEs and/or how each UE may transmit information to the network. Some of this information may be provided to UEs via a physical downlink control channel (PDCCH) and information corresponding thereto, such as downlink control information (DCI).

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
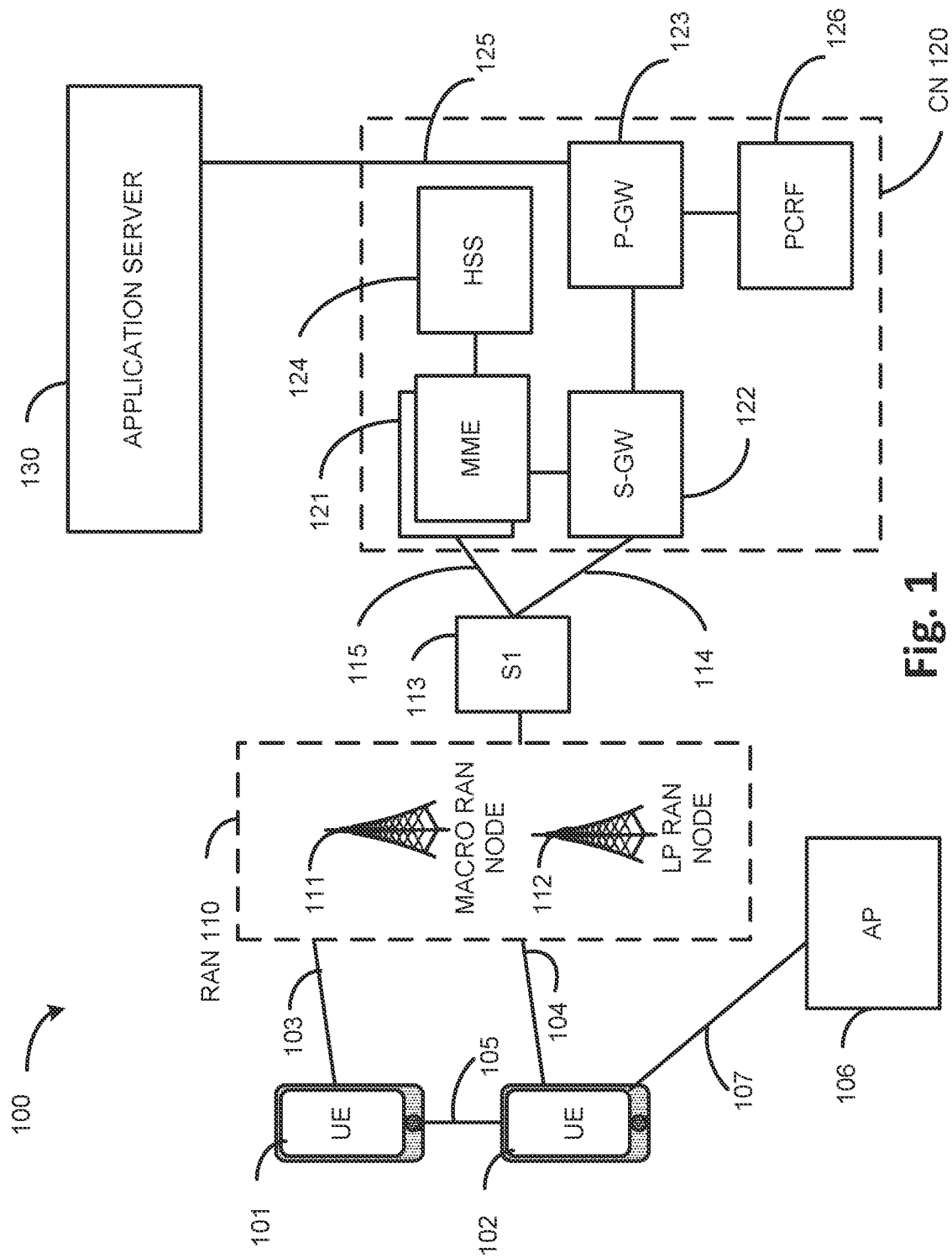
FIG. 1 illustrates an architecture of a system of a network in accordance with some embodiments.

The following detailed description refers to the accompanying drawings. The same reference numbers in different drawings may identify the same or similar elements. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Telecommunication technologies may involve a radio access network (RAN) node communicating control information to a user equipment (UE) via a physical downlink control channel (PDCCH). Control information may include a variety of information, including information about how and when the RAN node and UE are to communicate with one another (e.g., scheduling information, format information, etc.). In some scenarios, New Radio (NR) technology may enable the RAN node to use a particular type of PDCCH, referred to as a group-common PDCCH (GC-PDCCH), to communicate control information to one or multiple UEs in the cell. In some scenarios, a GC-PDCCH may be a particular example of a PDCCH carrying a particular downlink control information (DCI) format. The RAN node may use the GC-PDCCH to transmit slot format information (or slot format indicator) (SFI) that may indicate, or be used by UEs to derive the number of symbols in a slot, and how symbols within a slot have been allocated (e.g., which symbols are for downlink (DL) communications, which are for uplink (UL) communications, and which have not been allocated for DL or UL communications). SFI may be communicated to a UE as downlink control information (DCI). For instance, to communicate SFI to the UE, the RAN node may select a DCI format with one or more fields allocated, assigned, etc., for conveying SFI (also referred to as "SFI fields"). The RAN node may populate the SFI fields with SFI, and transmit the DCI to the UE via the GC-PDCCH.

Techniques, described herein, may enable a RAN node to use a PDCCH (or GC-PDCCH) to provide SFI to UEs. For example, a UE may communicate with a RAN node to complete a Physical Random Access Channel (PRACH) procedure. The RAN node may use UE-specific Radio Resource Control (RRC) signaling to provide the UE with a UE-specific PDCCH control resource set (CORESET) (or another type of SFI monitoring configuration) that may include information (e.g., time and frequency domain information, control channel element (CCE) and resource element group (REG) mapping information, etc.) for monitoring a PDCCH and obtaining SFI from the PDCCH. In other words, the SFI monitoring configuration, as described herein, may include one or more PDCCH candidates (e.g., portions of the PDCCH) that the UE may monitor for SFI intended for the UE.

As mentioned above, the UE may use the SFI to determine the number of symbols in one or more slots, and how each slot has been formatted (e.g., which symbols in the one or more slots have been allocated to downlink (DL) communications, which have been allocated to uplink (UL) communications, and which have not been allocated for DL or UL communications). In addition, upon determining the SFI, the UE may proceed to communicate with the RAN node in accordance with the SFI, which may include receiving DL information from the RAN node, transmitting UL information to the RAN node, etc.

In some scenarios, one or more techniques may be used to reduce the overhead that might otherwise be involved in the RAN node providing SFI to UEs. In some embodiments, instead of providing format information for each slot individually (e.g., whether and which symbols in each slot are allocated for UL, DL, or is not allocated) the RAN node may use higher layer signaling (e.g., UE-specific RRC signaling) to indicate that the slot format indicated in one SFI field (of a DCI format) may correspond to multiple slots (e.g., slots falling within an indicated duration). In this manner, the RAN node may reduce the total number of SFI fields used to convey SFI. In some embodiments, the UE may receive SFI indices (e.g., a set of distinct SFIs that are each associated with an index value), the RAN node may provide SFI as a SFI index value in a SFI field of a DCI format, and the UE may determine the slot formats to use when communicating with the RAN node by matching the SFI index value an SFI of the SFI indices.

In some embodiments, there may be multiple component carriers (CC) (e.g., a carrier aggregation (CA) scenario) or bandwidth parts (BWPs) allocated for communications between the UE and RAN node. In such scenarios, the RAN node may use UE-specific higher layer signaling (e.g., UE-specific RRC signaling) to provide the UE with an appropriate CORESET (or another type of SFI monitoring configuration) for each CC or BWP. Based on the CORESETs, the UE may monitor one or more GC-PDCCHs and obtain SFI for each CC or BWP established between the UE and RAN node, and proceed to communicate with the RAN node in accordance with the SFI for each CC or BWP. Additionally, or alternatively, the RAN node may transmit a common CORESET for each UE associated with a particular CC or BWP and use UE-specific RRC signaling to cause each UE receiving the common CORESET to modify the CORESET in a UE-specific manner, the result of which may include each UE having a UE-specific CORESET despite having initially received a common CORESET. The UE may then use the UE-specific CORESET to obtain SFI from a PDCCH (or a GC-PDCCH).

FIG. 1 illustrates an architecture of a system 100 of a network in accordance with some embodiments. The system 100 is shown to include UE 101 and a UE 102. The UEs 101 and 102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE or Narrowband (NB-IoT) UE, which can comprise a network access layer designed for low-power IoT applications utilizing short-lived UE connections. An IoT UE can utilize technologies such as machine-to-machine (M2M), machine-type communications (MTC), enhanced MTC, for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Each PDCCH may be transmitted using one or more of these CCEs, where each CCE may correspond to six sets of 12 physical resource elements (including three resource elements for PDCCH demodulation reference signals (DMRS) per REG) known as resource element groups (REGs). Nine Quadrature Phase Shift Keying (QPSK) symbols may be mapped to each REG. The PDCCH can be transmitted using one or more CCEs, depending on the size of the downlink control information (DCI) and the channel condition. There can be different PDCCH transmissions defined in NR with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
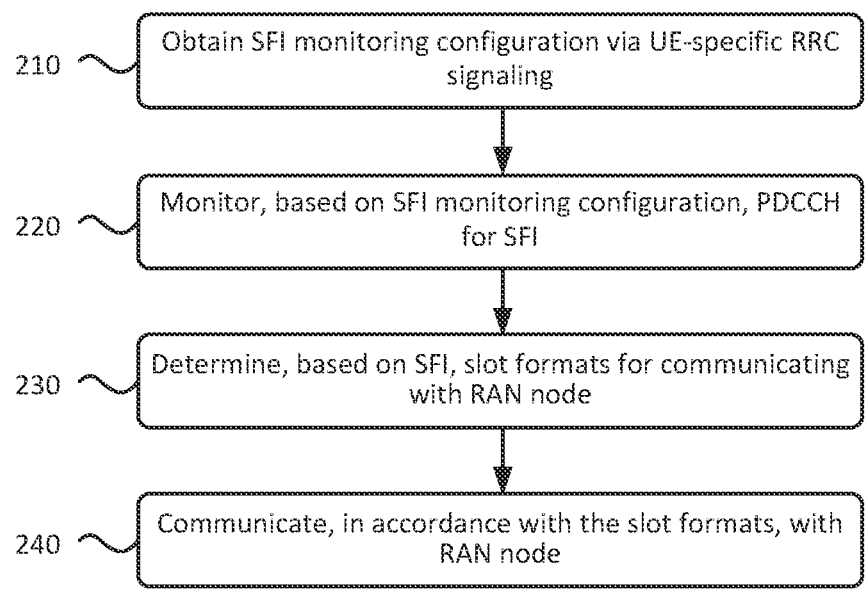
FIG. 2 is a flowchart diagram of an example process for determining slot format information (SFI) and communicating with a radio access network (RAN) node based on the SFI.

FIG. 2 is a flowchart diagram of an example process 200 for determining SFI and communicating with RAN node 111 based on the SFI. Process 200 may be implemented by UE 101. In some embodiments, one or more of the operations described in FIG. 2 may be performed in whole, or in part, by another device, such as one or more of the devices described above with reference to FIG. 1. Additionally, the example of FIG. 2 is provided as a non-limiting example. In practice, the example of FIG. 2 may include fewer, additional, and/or alternative, operations and/or functions.

As shown, process 200 may include obtaining a SFI monitoring configuration via UE-specific RRC signaling (block 210). For example, UE 101 may communicate with RAN node 111 to perform a PRACH procedure. As part of, or subsequent to, the PRACH procedure, RAN node 111 may use UE-specific RRC signaling to provide UE 101 with a UE-specific SFI monitoring configuration that (as described below) may indicate a set of PDCCH candidates using particular aggregation levels (ALs) (e.g., a GC-PDCCH) and portion thereof that is to be used by RAN node 111 to transmit SFI to UE 101. As described herein, a SFI monitoring configuration may include, in whole or in part, receiving and/or implementing CORESET information.

Process 200 may also include monitoring, based on the SFI monitoring configuration, a PDCCH for SFI (block 220). For example, the SFI monitoring configuration obtained by UE 101 may include a CORESET that may include information (e.g., time and frequency domain information, control channel element (CCE) and resource element group (REG) mapping information, etc.) and search space configuration that may include information (e.g., particular PDCCH candidates at certain indicated ALs) for monitoring a GC-PDCCH and obtaining SFI from the GC-PDCCH. As such, UE 101 may use the SFI monitoring configuration to determine, identify, monitor, etc., a PDCCH used by RAN node 111 and/or obtain SFI intended for UE 101 from the PDCCH.

Process 200 may also include determining, based on the SFI, slot formats for communicating with RAN node 111 (block 230). For example, based on the SFI, UE 101 may determine which symbols (e.g., in a slot) have been allocated to DL transmissions, UL transmissions, and/or symbols that have not been allocated for either type of transmission (which may also be referred to as other symbols, open symbols, flexible symbols, unknown symbols, and so on). As such, UE 101 may use the SFI to determine slot formats for communicating with RAN node 111.

Process 200 may also include communicating with RAN node 111 in accordance with the slot formats (block 240). For example, after having determined slot formats based on the SFI from RAN node 111, UE 101 may proceed to communicate with the RAN node 111 in accordance with the slot formats.

While FIG. 2, described above, provides a general example of a process that may be performed by UE 101 to determine SFI and communicate with RAN node 111. Example process 200 may be performed in one or more of a variety of ways. For example, to transmit the SFI to UE 101, RAN node 111 may select a DCI format that includes one or more SFI fields and may include the SFI in the SFI field of the DCI format. In such embodiments, the SFI monitoring configuration information previously obtained by UE 101 may include information for monitoring a PDCCH (e.g., a GC-PDCCH) for the DCI format. Additionally, or alternatively, RAN node 111 may use UE-specific RRC signaling to indicate to UE 101 the number of slots that correspond to SFI indicated in one or more SFI fields of DCI transmitted to UE 101. For example, an SFI field may indicate a particular slot format (e.g., a particular combination of DL, UL, or flexible symbols for the slot), and RAN node 111 may use RRC signaling to indicate, to UE 101, the slots (e.g., the number of consecutive slots) that correspond to the particular slot format, thereby reducing the transmission overhead between UE 101 and RAN node 111.

In some embodiments, multiple CCs and/or BWPs may be established between UE 101 and RAN node 111. In such a scenario, UE 101 may obtain a SFI monitoring configuration (e.g., a CORESET) for each CC or BWP. In some embodiments, UE 101 may obtain a set of SFI for each CC or BWP. In other embodiments, one or more CCs or BWPs may correspond to the same SFI. As such, RAN node 111 may use UE-specific RRC signaling to indicate, to UE 101, which CCs or BWPs use the same slot format, such that UE 101 may obtain one instance of SFI from the GC-PDCCH but apply the SFI to multiple CCs or BWPs, thereby reducing transmission overhead between UE 101 and RAN node 111.

In some embodiments, UE 101 and RAN node 111 may implement an index system to communicating SFI. For example, RAN node 111 may use UE-specific RRC signaling to provide UE 101 with indices (and/or another type of data structure) of distinct slot formats. As such, instead of transmitting SFI that comprehensively describes slot formats, RAN node 111 may instead provide an index value or another type of identifier (e.g., in a SFI filed of a particular DCI format) that corresponds to a slot format of the indices of slot formats provided to UE 101, and UE 101 may use the index value from the DCI to determine the slot format that is to be used to communicate with RAN node 111. In scenarios involving multipole CCs or BWPs, RAN node 111 may provide an index value for each CC or BWP, and/or information that enables UE 101 to determine which index value maps to which CC or BWP. Additionally, in the event that two or more CCs or BWPs may use the same slot format, RAN node 111 may transmit a single index value and an indication of which CCs or BWPs correspond to the slot format of the index value.

Figure 3:
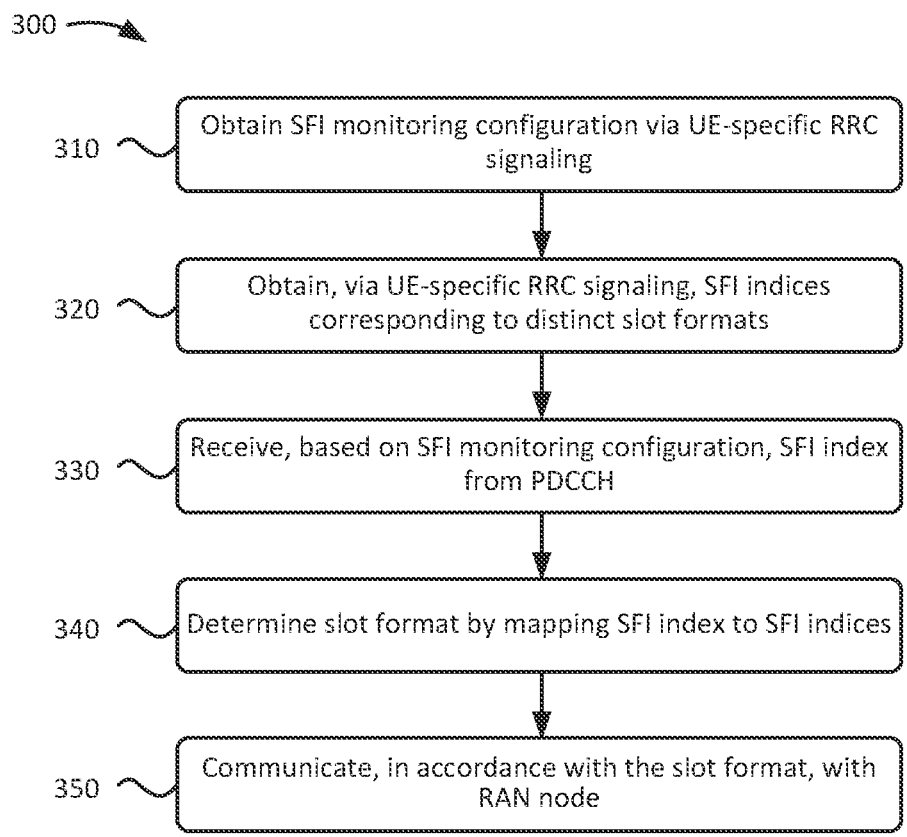
FIG. 3 is a flowchart diagram of an example process for determining SFI based on SFI indices.

FIG. 3 is a flowchart diagram of an example process 300 for determining SFI based on SFI indices. Process 300 may be implemented by UE 101. In some embodiments, one or more of the operations described in FIG. 3 may be performed in whole, or in part, by another device, such as one or more of the devices described above with reference to FIG. 1. Additionally, the example of FIG. 3 is provided as a non-limiting example. Additionally, the example of FIG. 3 is provided as a non-limiting example. In practice, the example of FIG. 3 may include fewer, additional, and/or alternative, operations and/or functions.

As shown, process 300 may include obtaining a SFI monitoring configuration via UE-specific RRC signaling (block 310). For example, UE 101 may communicate with RAN node 111 to perform a PRACH procedure. As part of, or subsequent to, the PRACH procedure, RAN node 111 may use UE-specific RRC signaling to provide UE 101 with a SFI monitoring configuration that (as described below) may indicate a set of PDCCH (e.g., a GC-PDCCH) candidates using particular aggregation levels (ALs) and portion thereof that is to be used by RAN node 111 to communicate SFI to UE 101.

Process 300 may include obtaining, via UE-specific RRC signaling, SFI indices corresponding to distinct slot formats (block 320). An SFI indices, as described herein, may include a list, table, array, or another type of data structure(s) that includes one or more slot formats that are each associated with a distinct identifier (e.g., an index value). Each slot format, for example, may include a candidate or template slot format (also referred to "candidate slot formats" or "slot format candidates") for multiple slots. The number of slots (and/or portions of the PDCCH and/or GC-PDCCH) to which a candidate slot format may pertain may be configured via higher layer signaling, such as RRC signaling.

Process 300 may include receiving, based on the SFI monitoring configuration, an SFI index from a PDCCH (block 330). For example, UE 101 may monitor a GC-PDCCH used by RAN node 111 to communicate control information. Additionally, based on the SFI monitoring configuration obtained from RAN node 111, UE 101 may determine SFI in the GC-PDCCH for UE 101. In some embodiments, the SFI may include a SFI index. For example, the SFI may include a DCI format with one or more fields (e.g., one or more SFI fields) containing one or more SFI indexes. As such, the SFI index may be provided as a particular field (an SFI field) of a DCI format used by RAN node 111 to provide control information to UE 101.

Process 300 may include determining a slot format by mapping the SFI index to SFI the SFI indices (block 340). For example, UE 101 may compare the SFI index obtained from the GC-PDCCH to the SFI indices received via the UE-specific RRC signaling. Additionally, when the SFI index obtained from the GC-PDCCH matches one of the SFI indices received via the UE-specific RRC signaling, UE 101 may determine the slot format based on the which of the SFI indices matches the SFI index obtained from the GC-PDCCH. In some embodiments, UE 101 may obtain multiple SFI indices that may, for example, be provided in a sequence-specific order. In such embodiments, the slot format determined by UE 101 may be a combination or sequence of slot formats (of the SFI indices) that is consistent with the sequence-specific SFI indices obtained from the GC-PDCCH.

Process 300 may also include communicating with RAN node 111 in accordance with the slot format (block 350). For example, after having determined slot formats based on the SFI from RAN node 111, UE 101 may proceed to communicate with the RAN node 111 in accordance with the slot formats.

Figure 4:
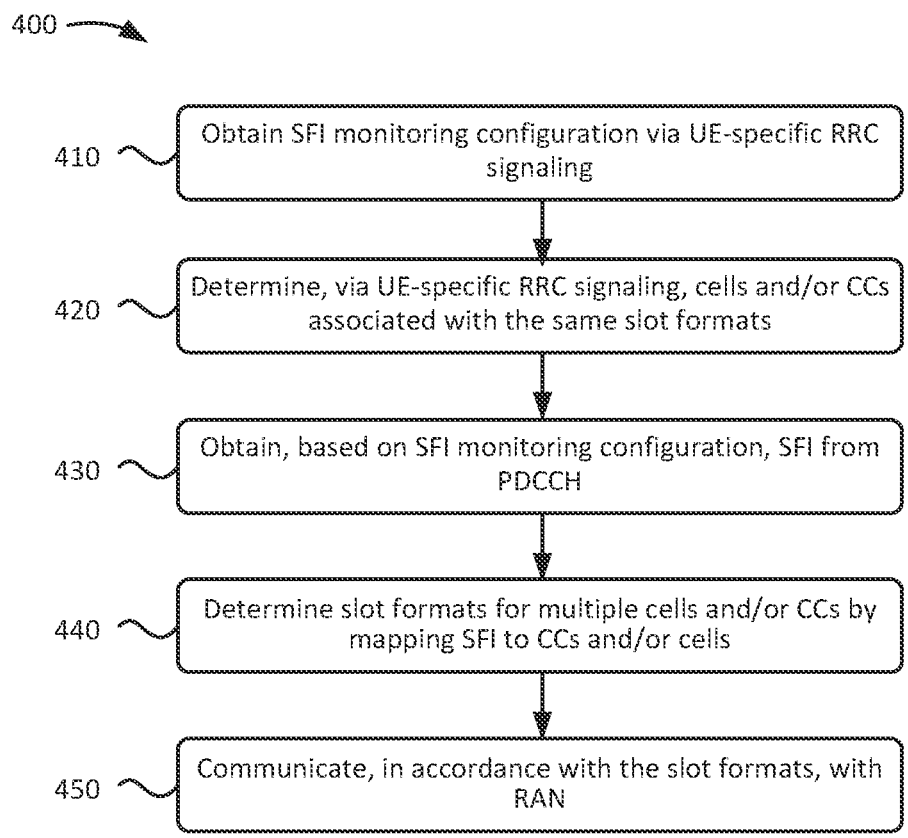
FIG. 4 is a flowchart diagram of an example process for determining slot formats for multiple cells and/or component carriers (CCs)

FIG. 4 is a flowchart diagram of an example process 400 for determining slot formats for multiple cells and/or component carriers (CCs). Process 400 may be implemented by UE 101. In some embodiments, one or more of the operations described in FIG. 4 may be performed in whole, or in part, by another device, such as one or more of the devices described above with reference to FIG. 1. Additionally, the example of FIG. 4 is provided as a non-limiting example. In practice, the example of FIG. 4 may include fewer, additional, and/or alternative, operations and/or functions.

As shown, process 400 may include obtaining a SFI monitoring configuration via UE-specific RRC signaling (block 410). For example, UE 101 may communicate with RAN node 111 to perform a PRACH procedure. As part of, or subsequent to, the PRACH procedure, RAN node 111 may use UE-specific RRC signaling to provide UE 101 with a SFI monitoring configuration that (as described below) may indicate a PDCCH (e.g., a GC-PDCCH) and/or portion thereof that is to be used by RAN node 111 to transmit SFI to UE 101.

Process 400 may also include determining, via UE-specific RRC signaling, multiple cells and/or CCs associated with the SFI monitoring configuration (420). For example, a wireless telecommunication network may support carrier aggregation (CA) which may include the network communicating with UE 101 via multiple cells and/or CCs. In some scenarios, two or more cells and/or CCs may use the same slot format to communicate with UE 101. As such, RAN node 111 may use UE-specific RRC signaling to provide UE 101 with information indicating which cells and/or CCs may be using the same slot format. As described below, providing UE 101 with such information may enable UE 101 determine the slot formats for multiple cells and/or CCs based on a single slot format (e.g., a single instance of SFI from RAN node 111). In some embodiments, the information received from RAN node 111 may include an indication of slot formats and the cells and/or CCs that correspond to (e.g., implement) each slot format.

Process 400 may include obtaining, based on the SFI monitoring configuration, SFI from a PDCCH (block 430). For example, UE 101 may use the SFI monitoring configuration to determine which PDCCH, and/or portion thereof (e.g., a GC-PDCCH), may be used by RAN node 111 to transmit SFI to UE 101. As such, UE 101 may monitor, and receive, the SFI from the indicated PDCCH.

Process 400 may include determining the slot formats for multiple cells and/or CCs by mapping the SFI to CCs and/or cells (block 440). For example, UE 101 may determine a slot format indicated by the SFI from RAN node 111 via a GC-PDCCH, and map the slot format to information previously received, via UE-specific RRC signaling, regarding which cells and/or CCs use each slot format. Upon determining a match between the SFI from the GC-PDCCH and the slot formats from the UE-specific RRC signaling, UE 101 may determine each cell and/or CC to which the SFI pertains. In some embodiments, each cell and/or CC may implement a different slot format. In some embodiments, multiple cells and/or CCs may implement the same slot format.

Process 400 may also include communicating with the RAN in accordance with the slot format(s) (block 450). For example, after having determined slot formats for the cells and/or CCs involved in a CA scenario between UE 101 and the RAN, UE 101 may proceed to communicate with the RAN in accordance with the slot formats.

Figure 5:
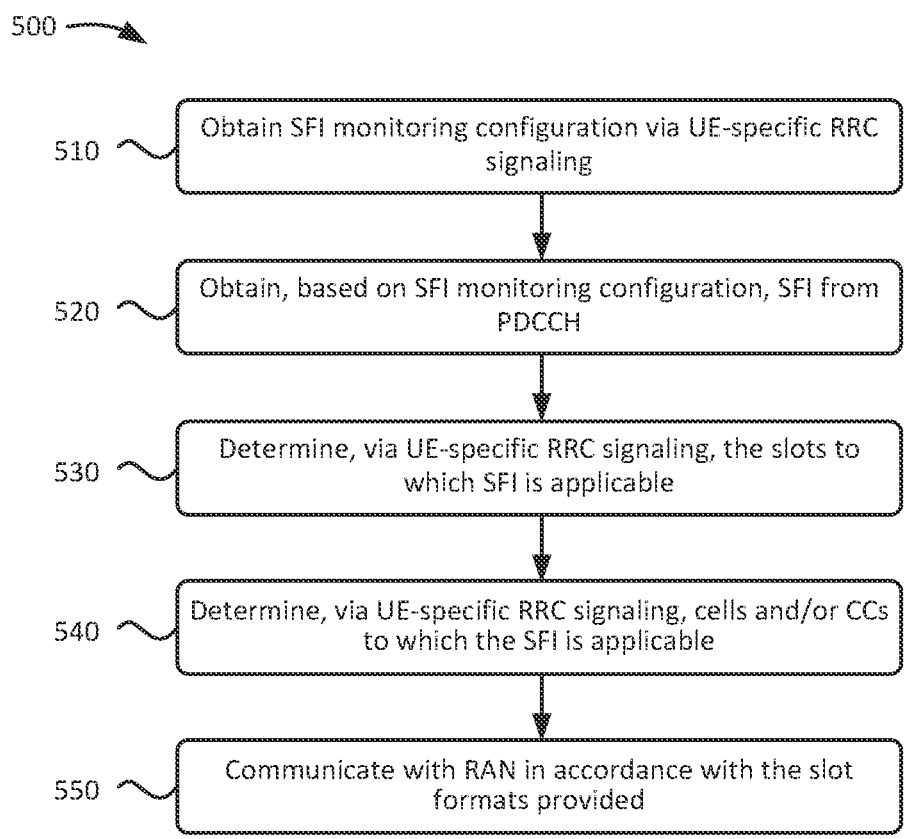
FIG. 5 is a flowchart diagram of another example process for determining slot formats for multiple cells and/or CCs.

FIG. 5 is a flowchart diagram of an example process 500 for determining slot formats for multiple cells and/or CCs. Process 500 may be implemented by UE 101. In some embodiments, one or more of the operations described in FIG. 5 may be performed in whole, or in part, by another device, such as one or more of the devices described above with reference to FIG. 1. Additionally, the example of FIG. 5 is provided as a non-limiting example. In practice, the example of FIG. 5 may include fewer, additional, and/or alternative, operations and/or functions.

As shown, process 500 may include obtaining a SFI monitoring configuration via UE-specific RRC signaling (block 510). As described herein, UE 101 may communicate with RAN node 111 to perform a PRACH procedure. As part of, or subsequent to, the PRACH procedure, RAN node 111 may use UE-specific RRC signaling to provide UE 101 with a SFI monitoring configuration that (as described below) may indicate a set of PDCCH (e.g., a GC-PDCCH) candidates using particular aggregation levels (ALs), and/or portion thereof that is to be used by RAN node 111 to communicate SFI to UE 101.

Process 500 may include obtaining, based on the SFI monitoring configuration, SFI from a PDCCH (block 520). For example, UE 101 may use the SFI monitoring configuration to determine which PDCCH, and/or portion thereof, may be used by RAN node 111 to transmit SFI to UE 101. UE 101 may monitor, and receive, the SFI from the indicated PDCCH. Additionally, or alternatively, the SFI may indicate the manner in which symbols in slots are formatted for UL transmissions, DL transmissions, and/or symbols that have not been designated for either UL or DL transmissions. Additionally, or alternatively, SFI may include other types of information as well, such as a slot format identifier or index (that may be mapped to a particular slot format). RAN node 111 may provide SFI in a field of DCI information (e.g., as a SFI filed of a particular DCI format). In some embodiments, some or all of the SFI, as described herein, provided by RAN node 111 may be provided in an additional, or an alternative form, such as a different type of DCI information, a different field of a particular DCI format, etc.

Process 500 may also include determining, via UE-specific RRC signaling, the slots for which SFI is applicable (block 530). For example, while SFI may indicate the format of one or more slots, RAN node 111 may use RRC signaling to indicate, to UE 101, the slots to which SFI may apply, which may include a number or range of consecutive slots. As such, UE 101 may use the SFI to determine a particular slot format (e.g., a particular combination of DL, UL, or flexible symbols for the one or more slots being transmitted by RAN node 111, and UE 101 may rely on UE-specific RRC signaling to determine the particular slots to which the SFI applies. In this manner, RAN node 111 may not, for example, transmit SFI for each slot. Instead, RAN node 111 may use RRC signaling to indicate which and/or how many slots the type of slot format is applicable, and then, may transmit a type of slot format via the PDCCH.

Process 500 may also include determining, via UE-specific RRC signaling, cells and/or CCs to which the SFI is applicable (block 540). As mentioned above, UE 101 may be operating in a CA scenario which may involve multiple cells and/or CCs, and some of the cells and/or CCs may be using the same slot format. As such, RAN node 111 may use RRC signaling to notify UE 101 which cells and/or CCs are using the same slot format so that, for example, RAN node 111 does not, for example, transmit the same, or similar, SFI (e.g., redundant SFI) to UE 101.

Process 500 may also include communicating with the RAN in accordance with the slot formats provided (block 550). For example, based on SFI obtained from the GC-PDCCH and the information received from UE-specific RRC signaling about the slots, cells, and/or CCs to which the SFI may apply, UE 101 may determine to slot format(s) for communicating with the RAN, which may include multiple cells and/or CCs. As such, UE 101 may proceed with sending and receiving information from the RAN in accordance with the slot formats determined by UE 101.

Figure 6:
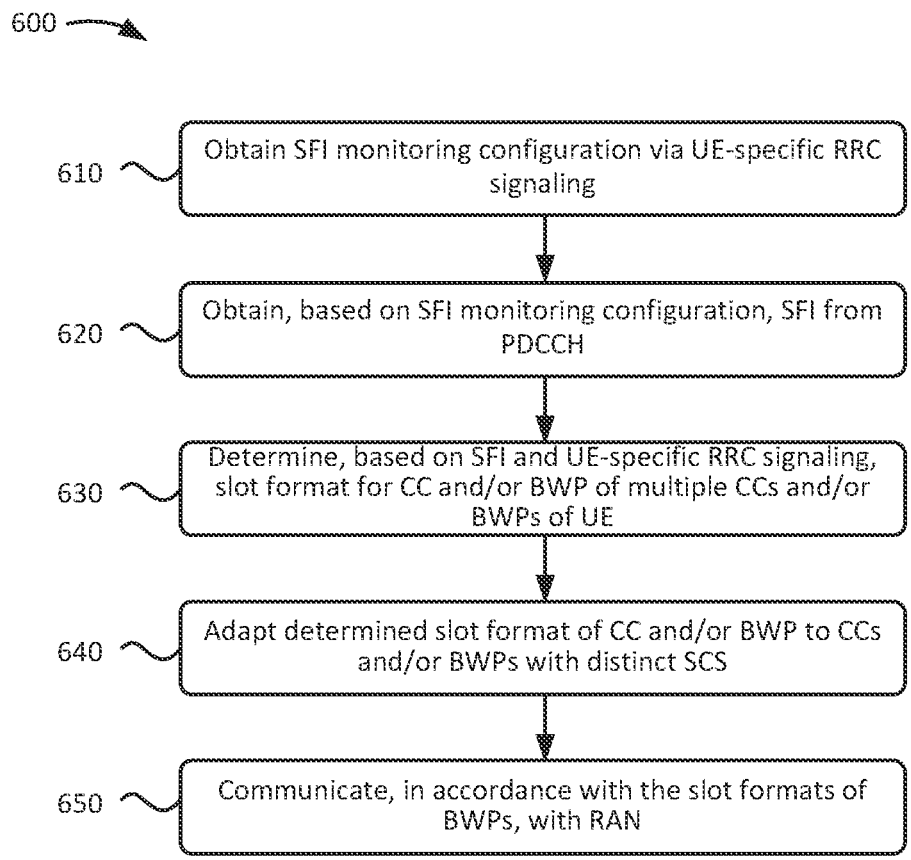
FIG. 6 is a flowchart diagram of an example process for determining slot formats for CCs and/or bandwidth parts (BWPs) with different subcarrier spacings (SCSs)

FIG. 6 is a flowchart diagram of an example process 600 for determining slot formats for CCs and/or BWPs with different subcarrier spacings (SCSs). Process 600 may be implemented by UE 101. In some embodiments, one or more of the operations described in FIG. 6 may be performed in whole, or in part, by another device, such as one or more of the devices described above with reference to FIG. 1. Additionally, the example of FIG. 6 is provided as a non-limiting example. In practice, the example of FIG. 6 may include fewer, additional, and/or alternative, operations and/or functions.

As shown, process 600 may include obtaining a SFI monitoring configuration via UE-specific RRC signaling (block 610). As described herein, UE 101 may communicate with RAN node 111 to perform a PRACH procedure. As part of, or subsequent to, the PRACH procedure, RAN node 111 may use UE-specific RRC signaling to provide UE 101 with a SFI monitoring configuration that (as described below) may indicate a PDCCH, and/or portion thereof (e.g., a GC-PDCCH) that is to be used by RAN node 111 to communicate SFI to UE 101.

Process 600 may include obtaining, based on the SFI monitoring configuration, SFI from a PDCCH (block 620). For example, UE 101 may use the SFI monitoring configuration to determine which PDCCH, and/or portion thereof, may be used by RAN node 111 to transmit SFI to UE 101. UE 101 may monitor, and receive, the SFI from the indicated PDCCH. Additionally, or alternatively, the SFI may indicate the manner in which symbols in slots are formatted for UL transmissions, DL transmissions, and/or symbols that have not been designated for either UL or DL transmissions. Additionally, or alternatively, SFI may include other types of information as well, such as a slot format identifier or index (that may be mapped to a particular slot format that may have previously been provided to UE 101 by RAN node 111 via RRC signaling). RAN node 111 may provide SFI in a field of DCI (e.g., as a SFI filed of a particular DCI format). In some embodiments, some or all of the SFI, as described herein, provided by RAN node 111 may be provided in an additional, or an alternative form, such as a different type of DCI, a different field of a particular DCI format, etc.

Process 600 may also include determining, based on the SFI and UE-specific RRC signaling, a slot format for a CC and/or BWP of multiple CCs and/or BWPs of UE 101 (block 630). For example, as UE 101 may be configured to use multiple CCs and/or BWPs to communicate with the network, UE 101 may also be configured to determine a slot format for each CC and/or BWP. As such, UE 101 may use one or more of the techniques, described herein, for determining a slot format based on SFI and UE-specific RRC signaling from RAN node 111, examples of which may include receiving explicit format information for each individual slot, mapping a slot format value (e.g., an index value of a SFI field) to an indices of template slot formats, applying a type of slot format (e.g., a particular combination of DL, UL, or flexible symbols for the slot) to a number or range consecutive slots, etc.

Process 600 may include adapting the determined slot format to CCs and/or BWPs with distinct SCSs (block 640). As described above, UE 101 may determine a slot format for a CC and/or BWP based on the SFI and UE-specific RRC signaling from RAN node 111. While in some embodiments, RAN node 111 may provide SFI and UE-specific RRC signaling for each CC and/or BWP allocated to UE 101, such that UE 101 may determine the slot formats for each CC and/or BWP based on the SFI and UE-specific RRC signaling from RAN node 111, in some embodiments, UE 101 may determine a slot format for a CC and/or BWP based on the determined slot format of another CC and/or BWP.

The manner in which UE 101 may adapt a determined slot format may be based on the SCSs of CCs and/or BWPs. For example, assume that UE 101 has a BWP with a SCS of 15 kHz and a BWP with a SCS of 60 kHz, and that UE 101 has determined the slot format for the BWP with a SCS of 15 kHz but not the slot format for the BWP with a SCS of 60 kHz. In such a scenario, UE 101 may determine that each slot (and corresponding slot format or symbol type (e.g., UL, DL, or other) of the BWP with the SCS of 15 kHz may be mapped or otherwise correspond to four slots of the BWP with the SCS of 60 kHz since the ratio of 60 kHz to 15 kHz is 4 to 1. As such, UE 101 may determine the slot formats of multiple CCs and/or BWPs by scaling the slot format of one CC and/or BWP to another CC and/or BWP based on the relative size of the SCSs of the CCs and/or BWPs.

Process 600 may also include communicating with the RAN in accordance with the slot formats of the BWPs and/or CCs (block 650). For example, upon determining the slot formats of BWPs and/or CCs that UE 101 is to use to communicate with the RAN, UE 101 may proceed by receiving and/or transmitting information to the RAN in accordance with the slot formats.

Further to the examples descried above, the SFI for a single CC or BWP, a limited number of bits (e.g., 2 to 4 bits) may be used to indicate the SFI from a set of slot formats configured via higher layers (e.g., UE-specific RRC signaling) out of the overall space of slot formats possible (e.g., $3^7$ or $3^{14}$ for 7-symbol and 14-symbol slots, respectively). The candidate sets of slot formats can be separately configured for 7-symbol and 14-symbol slots.

Additionally, for a GC-PDCCH carrying the SFI for a cell and/or CC, UEs 101 may be configured with a CORESET. In some embodiments, the CORESET may be of common CORESET type (e.g., the configuration of the CORESET may not be UE-specific) for multiple UEs 101 monitoring a GC-PDCCH. In another embodiment, instead of a single common CORESET for multiple UEs 101, multiple instances of GC-PDCCH may be transmitted by RAN node 111 in accordance with different UE-specific, or common CORESETs, within a CC or BWP, and either UE-specific or UE-group-specific higher layer signaling may be used to configure the respective CORESETs to different UEs 101 to monitor for GC-PDCCH with SFI.

Additionally, SFI may be indicated for multiple slots with the number of slots being indicated via the GC-PDCCH. For example, 2 bits may be used to indicate the number of slots that the SFI applies to. In another embodiment of this example, 2 bits in the G-C PDCCH may be used to indicate one of four values for the number of slots to which SFI may apply, with the four values being configured via higher layers (e.g., via NR minimum system information (MSI), NR remaining minimum system information (RMSI), NR system information block (SIB) or UE-specific radio resource control (RRC) signaling). In some embodiments, the SFI for multiple slots may not include the slot format for some reserved slots (e.g., a slot used for the transmission of synchronization signal (SS) blocks, physical random access channel (PRACH), etc.). In another example, M bits may be used in the GC-PDCCH to indicate $2^M-1$ values for numbers of slots as described above and one code-point may be used to indicate that the number of slots the SFI equals the monitoring periodicity of the GC-PDCCH carrying SFI. For the latter case, this may imply that the indicated SFI applies to all slots within two consecutive monitoring instances of GC-PDCCH carrying SFI.

Additional techniques, described herein, may enable efficient shortened PDCCH (sPDCCH) transmissions, taking advantage of an availability of multiple transmit and/or receive antennas of UEs and/or RAN nodes. The 3GPP LTE Communication Standard has, to a degree, introduced a shorter, or shortened, Transmission Time Interval (sTTI) (also referred to as a mini-slot) to better cater to services and devices with high latency requirements (e.g., services and devices that may be undermined by latency). sTTIs may be implemented by splitting a 1 millisecond (ms) subframe into multiple TTIs, or in other words, by designating TTIs with a duration shorter than a subframe (e.g., 1 ms). For example, a 1 ms subframe of 14 symbols may be used to implement sTTIs by dividing the subframe into 6 sTTIs, where 4 of the sTTIs are 2 symbols each, and 2 of the sTTIs are 3 symbols each (for a total of 14 symbols). While the use of sTTIs may increase the capacity of a RAN to cater to services and devices with high latency requirements, it may also increase the time, resources, and complexity involved in a UE attempting to decode the PDCCH via blind decoding (BD).

Techniques described herein may enable the use of sTTIs in PDCCHs while minimizing the time, resources, and complexity required to do so. A sPDCCH may include a PDCCH implementing sTTIs. As described herein, UE 101 may inform RAN node 111 regarding the blind decoding capabilities of the UE (e.g., the maximum number of blind decoding attempts (BDAs) that UE 101 may make within a sTTIs, a subframe, or another a reference time window). Alternatively, the maximum number of BDAs for UE 101 may be indicated on a per CC basis in case of CA. In some embodiments, UE 101 may determine and transmit an Aggregation Level (AL) of UE 101 to RAN node 111, which may be based on a signal-to-noise ratio (SNR) measured by UE 101. In some embodiments, a relatively low SNR may correspond to a higher AL (e.g., an AL of 2 or 4) and a relatively high SNR may correspond to a lower AL (e.g., an AL of 1). The AL of UE 101 may indicate, or be used to indicate, the number of shortened channel control entities (sCCEs) to be used to communicate DCI from RAN node 111 to UE 101. For example, an AL of 2 may indicate that 2 sCCEs are to be used to communicate the DCI, and an AL of 4 may indicate that 4 sCCEs may be used to communicate the DCI.

Based on the blind decoding capabilities and/or AL of UE 101 (and/or one or more other factors described herein) RAN node 111 may determine where to include the DCI for UE 101 within a sPDCCH (e.g., which sTTIs and/or CCEs) to use for transmitting the DCI within the sPDCCH). UE 101 may determine, based on the AL of the UE, the potential or candidate sPDCCH resources (e.g., sTTIs, CCEs, etc.) and/or DCI formats that RAN node 111 may use to transmit the DCI. Additionally, UE 101 may monitor the sPDCCH (in accordance with the determined potential or candidate sPDCCH resources), thereby obtain the DCI from RAN node 111, and use the DCI to further communicate with RAN node 111. Details of such techniques, and others, are discussed below with reference to FIGS. 7-12.

Figure 7:
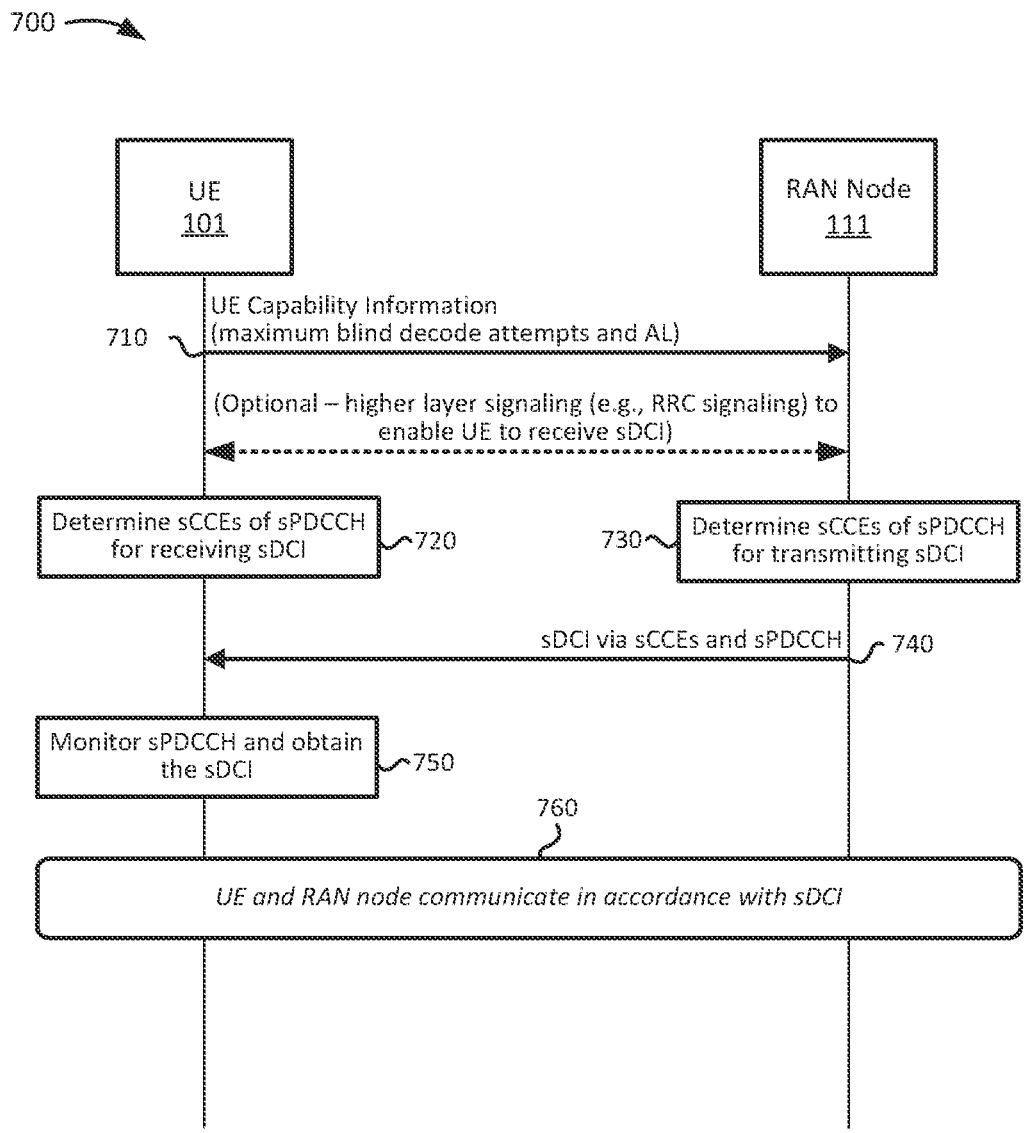
FIG. 7 is a sequence flow diagram of an example process for providing downlink control information (DCI) via shortened channel control entities (sCCEs)

FIG. 7 is a sequence flow diagram of an example process 700 for providing DCI via sCCEs. As shown, the example of FIG. 7 may include UE 101 and RAN node 111. The example of FIG. 7 is provided as a non-limiting example. In practice, the example of FIG. 7 may include fewer, additional, and/or alternative, operations, functions, and/or transmissions. Additionally, one or more of the operations or functions of FIG. 7 may be performed by fewer, additional, or alternative devices, which may include one or more of the devices described above with reference to FIG. 1.

As shown, UE 101 may transmit UE capability information to RAN node 111 (at 710). The UE capability information may include a maximum number of BDAs that UE 101 may be configured to use during a sTTI. In some embodiments, the maximum number of BDAs may be indicated on a per CC basis in case of CA. The number of BDAs supported by the UE (e.g., for a CC) may be a field value (X) to minimize the control signaling overhead, where X may be an integer (e.g., X=32). In some embodiments, a further reduction in signal overhead may be achieved by defining a information element field (e.g., sMaxBlindDecoding) to indicate the maximum number of BDAs in a reference time window, which may be independent of sTTI length and/or configured by RAN node 111 for UE 101 (via higher layer signaling or otherwise). An example of a reference time window may include a legacy TTI length (e.g., 1 ms). This technique may alleviate UE 101 from sending multiple messages to RAN node 111 for different sTTI length support.

Additionally, or alternatively, the UE capability information may include an AL of UE 101. The AL of the UE may be based on a SNR measured by the UE, and may indicate (or be used to indicate) the number of sCCEs to be used to communicate DCI from RAN node 111 to UE 101. For example, an AL of 1 may indicate that 1 sCCE is to be used to communicate DCI, AL of 2 may indicate that 2 sCCE is to be used to communicate DCI, and an AL of 4 may indicate that 4 sCCEs may be used to communicate DCI. In other embodiments, a different number of ALs may indicate a different number of sCCEs. A CCE, as described herein, may include one or more resource elements (REs) that may be organized into one or more Resource Element Groups (REGs) and a sCCE may include a portion of a CCE.

RAN node 111 may determine sCCEs candidates (including a number of candidates and their location(s) in the sPDCCH region), of a sPDCCH, for transmitting shortened DCI (sDCI) (at 720 and 730) based on the maximum BDAs capability reported by UE 101. For example, UE 101 may include an equation, process, data structure (e.g., a table, array, etc.) that enables UE 101 to determine sCCEs candidates based on the maximum BDAs supported by UE 101. A CCE, as described herein, may include one or more resource elements (REs) that may be organized into one or more resource element groups (REGs). A sCCE, as described herein, may include a portion of a CCE. Additionally, the sCCEs corresponding to a sPDCCH candidate (e.g., a portion of a PDCCH that may be used to transmit sDCI information) may be determined based on a variety of factors, such as an AL of UE 101, a total number of sCCEs in a sPDCCH physical resource block (PRB) set, a maximum number of sPDCCH candidates that can be configured for sPDCCH monitoring in a sTTI, etc. For example, the sCCEs corresponding to a sPDCCH candidate (m) at a AL within a UE-specific sTTI search space can be given with the following equation:

$$L\left\{\left[Y_{p,k} + \left\lfloor \frac{m \cdot N_{sCCE,p}}{L \cdot M^{(L)}} \right\rfloor + b\right]\right\} \bmod \lfloor N_{sCCE,p}/L \rfloor + i$$

Where $i=0, \ldots, L-1$ and $N_{sCCE,p}$ may be the total number of sCCEs in a sPDCCH PRB set p, k may be the sTTI index (or another type of identifying value) and b=0 for self-scheduling case and $b=n_{CI}$, otherwise where $n_{CI}$ is the carrier indicator field value. M may include a maximum number of sPDCCH candidates that can be configured for sPDCCH monitoring in a sTTI, and $M^{(L)}$ may include a maximum number of sPDCCH candidates that can be configured for sPDCCH monitoring in a sTTI at a particular AL L. Each sPDCCH PRB set may be configured for either localized transmission or distributed sPDCCH transmission. In some embodiments, $Y_{p,k}$ may be configured with a value for a respective sPDCCH resource block (RB) set by higher layers (e.g., RRC signaling before or during process 700 of FIG. 7) in a UE-specific manner.

In some embodiments, $Y_{p,k}$ may be provided, and/or determined, as follows:

$Y_{p,k} = (A_p \cdot Y_{p,k-1}) \bmod D$

Where $Y_{p,-1} = n_{RNTI}$, $A_0=39827$, $A_1=39829$, $D=65537$. Various techniques may be used to configure the number of sPDCCH candidates $m \in \{0, 1, \ldots, M_p^{(L)}\}$ for a sPDCCH resource set (p) in one sTTI. In some embodiments, UE 101 may be configured with $M_p^{(L)}$, which may denote the maximum number of sPDCCH candidates among all the sDCI formats associated with an AL (L) in sPDCCH PRB set (p), where $M_p^{(L)} \in \{0, 1, \ldots, M\}$ and M may be the maximum number of sPDCCH candidates that can be configured for sPDCCH monitoring in a sTTI and $\Sigma\Sigma_{L,p} M_p^{(L)} \leq M$. For a sPDCCH resource set, $M_p^{(L)}$ may be a non-zero for at least one AL. Since there may be a different number of sTTIs within a subframe for 2-symbols and slot-based sTTI configurations, different sets of AL that UE may monitor may be defined, respectively. In some designs, a first set of ALs may include ALs 1, 2 and 4 (i.e., L∈{1, 2, 4}) which may be applied for sPDCCH monitoring in 2-symbols sTTI. While, a second set of ALs may include ALs 1, 2, 4 and 8 (i.e., L∈{1, 2, 4, 8}) which may be applied for slot-based sTTI. These two AL sets may be partially overlapped or non-overlapped. In other words, the elements of one configuration may be a subset of that of another configuration (i.e., fully overlapped, for example, one configuration may include {1, 2, 4} and configuration may include {1, 2, 4, 8}). In some other embodiments, the elements of two configurations may have at least one different value, e.g., one configuration may include {1, 2, 4}, while the other may include {1, 8}.

In some embodiments, a subset of the first and/or second AL sets may be configured to UE 101 as part of the sPDCCH resource RB set configuration by higher layers, e.g., based on a DL SNR. For example, for 2-symbol sTTI operations, L∈{1, 2} may be configured for UEs 101 with a high DL SNR; while L∈{2, 4} may be configured for UEs 101 with a low DL SNR. Additionally, or alternatively, UE 101 may be configured to have a maximum number of ALs of 2 to further control blind decode (BD) complexity. Accordingly, the maximum number of BDAs per sTTI (i.e., M) may be determined based on sTTI length and may be different for 2-symbol sTTIs and slot-based sTTIs. In some embodiment, M may be 4 or 6 for 2-symbol sTTIs, while M may be 16 or 18 for slot-based sTTIs, aiming for a same number of BDAs for a 2-symbol and a slot-based sPDCCH over a subframe. In some embodiments, the corresponding BDAs of each AL, for a sPDCCH resource set, may be configured by higher layers (e.g., BDAs {3, 2, 1} for AL {1, 2, 4} for UE 101 with a good SNR and BDAs {0, 4, 2} for AL {1, 2, 4} for UE 101 with a bad SNR). This approach may provide sufficient flexibility to RAN node 111, in terms of available ALs, to adapt to radio channel variation, and in terms of sPDCCH candidates' locations, to reduce the probability that signal blocking might occur.

According to some embodiments, UE 101 operating in a sTTI system (e.g., a RAN supporting sTTIs) may be configured with higher layer signaling (e.g., one or more RRC information elements (IEs) such as IE sPDCCH-candidateReduction) for a specific search space at AL (L) and sPDCCH PRB set (p) of a serving cell (e.g., RAN node 111). In such a scenario, a corresponding number of sPDCCH candidates may be determined by:

$$M_p^{(L)} = \text{round}(\alpha \times M_{p,full}^{(L)})$$

Where value of α may be determined according to Table 1 below.

TABLE 1

Scaling factor for sPDCCH candidate reduction

| sPDCCH-candidateReductions | Value of a |
|---|---|
| 0 | 0 |
| 1 | 0.33 |
| 2 | 0.66 |
| 3 | 1 |

Alternatively, the value of a may be configured (for UE 101) using RRC signaling and/or $M_{p,full}^{(L)}$ may represent a reference number of sPDCCH candidates at AL L in sPDCCH-PRB-set p, which may be tabulated in accordance with the 3GPP communication standard and/or indicated by higher layers (e.g., RRC signaling) on a per-sPDCCH RB set basis.

As shown, RAN node 111 may transmit sDCI to UE 101 via the sCCEs and sPDCCH (at 740). While RAN node 111 transmits the sDCI, UE 101 may be monitoring the sPDCCH for the sDCI such that UE 101 is able to obtain the sDCI from the sCCEs and sPDCCH (at 750). UE 101 and RAN node 111 may communicate with one another in accordance with the sDCI from RAN node 111 (at 760).

Figure 8:
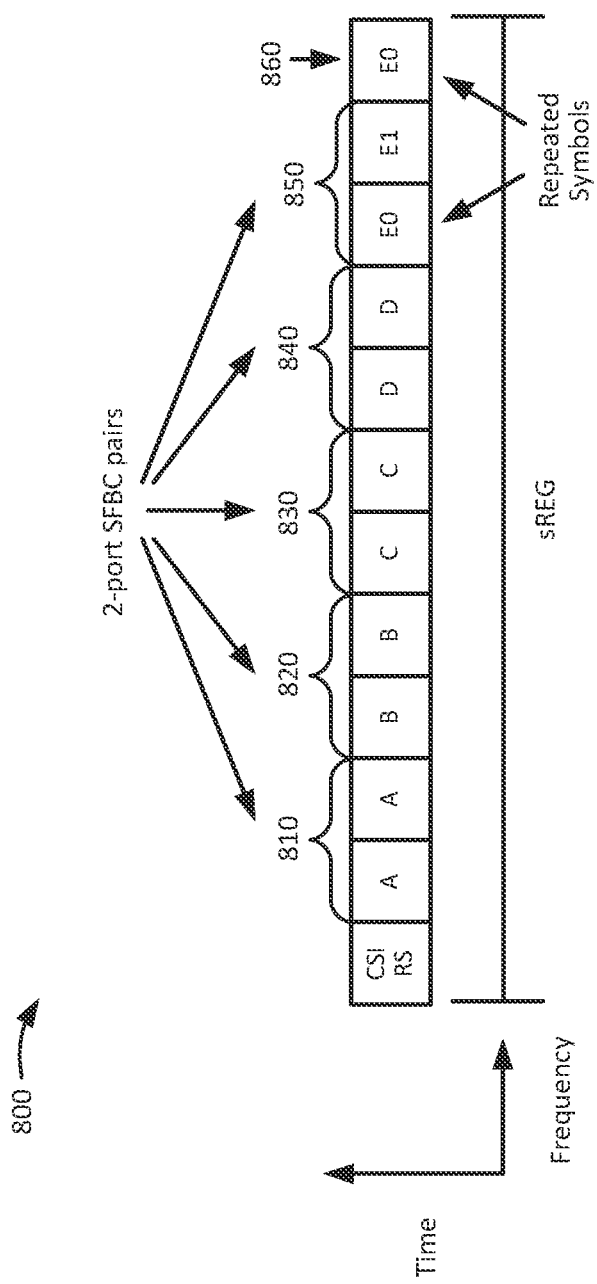
FIGS. 8-10 are diagrams of example shortened resource element groups (sREGs) according to one or more embodiments described herein.
Figure 9:
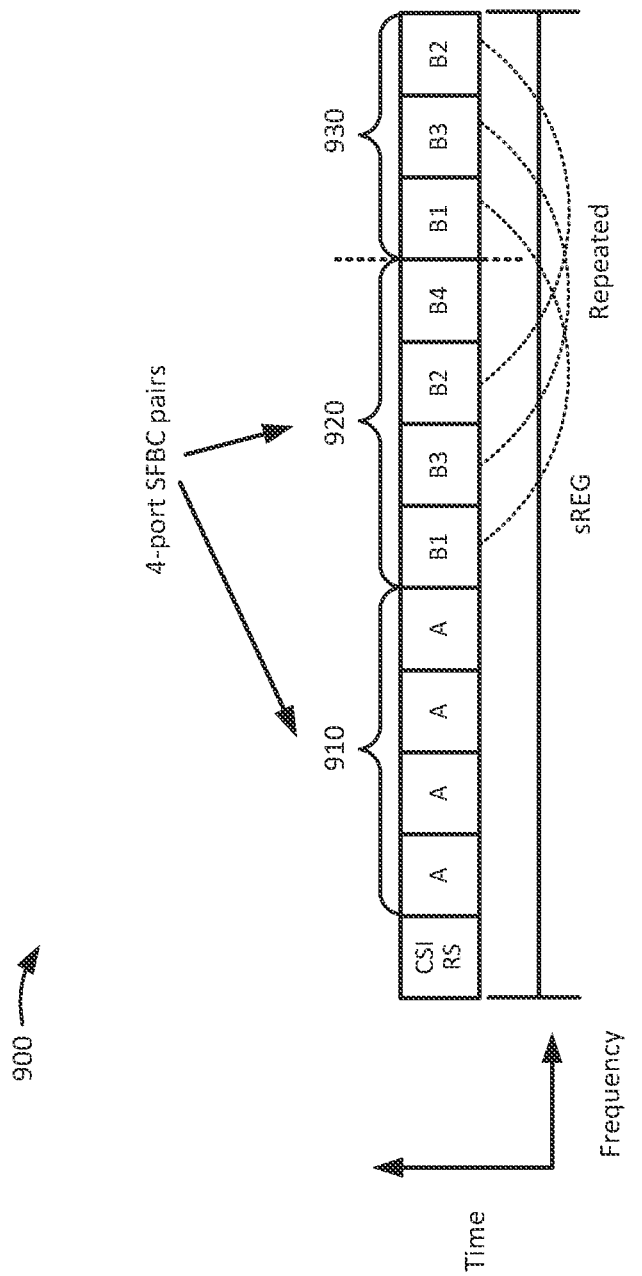
Figure 10:
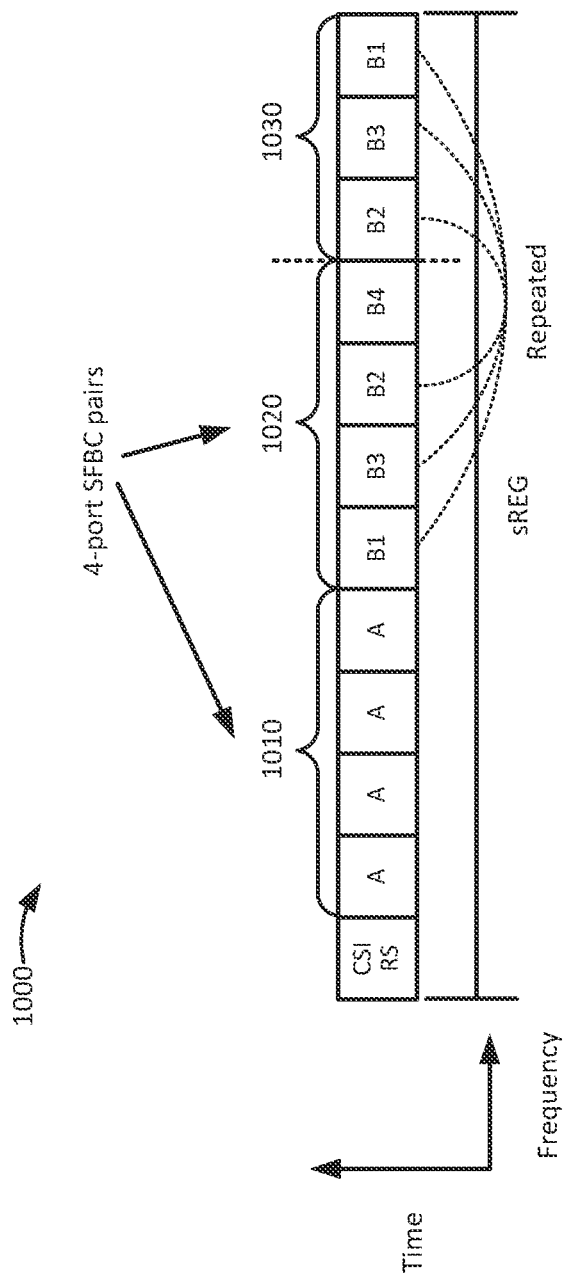

FIGS. 8-10 are diagrams of example sREGs 800, 900, and 1000 according to one or more embodiments described herein. As shown, each sREG 800, 900, and 1000 may include channel state information reference signal (CSI-RS) information and 11 available REs. In some embodiments, as depicted in sREG 800, when 2 cell-specific reference signals (CRS) ports transmit diversity is configured, the first 10 available REs (e.g., SFBC pairs 810-850) may be grouped as 5 Space Frequency Block Coding (SFBC) pairs, using Alamouti code in the frequency, which are marked in REG 800 with upper case combination of alphabets A to E. For the remaining RE (sCCE 660, marked with E0), the modulation symbol transmitted in the first RE of neighbor SFBC pair (e.g., E0 in SFBC pair 850) may be repeated and transmitted by each CRS antenna port to, for example, provide for greater spatial diversity gain.

Referring to sREG 900 of FIG. 9, when 4 CRS ports transmit diversity is configured, the first 8 available REs may be organized into 2 SFBC pairs 910 and 920. For the remaining 3 available REs, the first three modulation symbols transmitted in the first three REs of neighbor SFBC pair (e.g., sCCEs B1, B3 and B2 of SFBC pair 920) may be repeated and transmitted in REG 930, respectively. As shown in FIG. 10, example sREG 1000 may include a similar arrangement of REs and SFBC pairs 1010 and 1020 for 4-port SFBC pairs. However, the remaining REs 1030 may be repeated in a different manner (e.g., B2, B3, and B1) which may be due to, for example, a high channel correlation between consecutive frequency tones. The techniques described herein may include all the other combinations of repeated REs and/or RE sequences (e.g., B1, B2, B4, etc.) for repeating REs of a neighboring SFBC pair.

Figure 11:
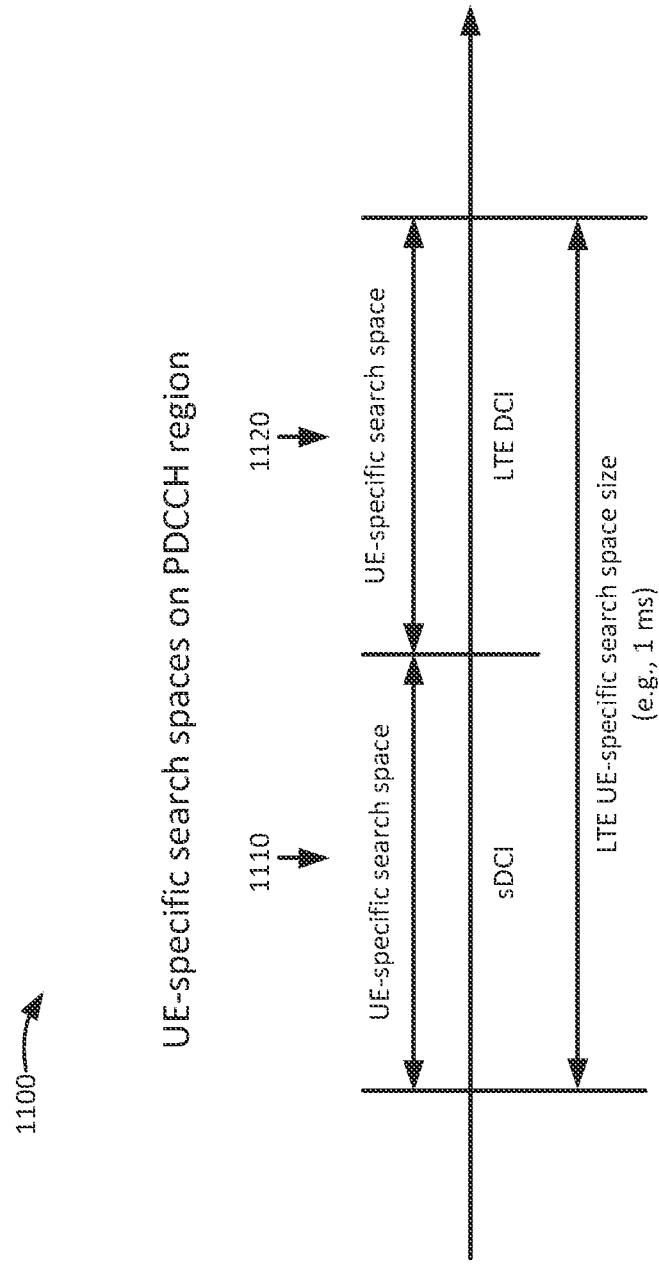
FIG. 11 is a diagram of an example subframe for transmitting shortened DCI (sDCI) via a legacy physical downlink control channel (PDCCH)

FIG. 11 is a diagram of an example subframe 1100 for transmitting sDCI via a legacy PDCCH. Subframe 1100 may correspond to a legacy TTI (e.g., 1 ms) and may include a portion 1110 for sDCI, which may correspond to a sTTI, and another portion 1120 for DCI (e.g., LTE DCI). UE 101 may be configured to monitor subframe 1100 to obtain sDCI and/or additional DCI.

As shown in FIG. 11, in some embodiments, the search space of sDCI in a PDCCH region may be a subset of the search space of PDCCH for DCI format monitoring. For instance, assuming that UE 101 is configured to monitor $M^L$ candidates in a UE-specific search space (USS) of a on PDCCH region, UE 101 may search a first set of PDCCH candidates of the $M^L$ candidates for sDCI monitoring. In one embodiment, the first set of PDCCH candidates within the PDCCH region may be the first $M_{sTTI}^{DL}$ PDCCH candidates for obtaining the sDCI, where $M_{sTTI}^{DL}$ may be the sPDCCH candidates number for sDCI formats monitoring, which is configured by higher layers (e.g., via RRC signaling) on a per AL and/or a per UE 101 basis. In addition, UE 101 may be configured to continuously monitor the $(M^L - M_{sTTI}^{DL})$ PDCCH for the DCI format wherein $M^L$ may be the total number of candidates UE is required to monitor in PDCCH region.

As such, subframe 1100 may include two UE-specific search spaces. One UE-specific search space may correspond to a portion 1110 for sDCI, and the other UE-specific search space may correspond to a portion 1120 for DCI (e.g., LTE DCI). The first UE-specific search space (e.g., portion 1110) and the second UE-specific search space (e.g., portion 1120) may be configured by higher layers (e.g., via RRC signaling) and/or may be partially overlapped in terms of CCE candidates. The first search space for sDCI format in PDCCH region may be a subset of the second search space. In other words, the first UE-specific search space may be the same as the second (or legacy) search space for DCI format monitoring. This may provide RAN node 111 flexibility to distribute, for example, the number of PDCCH candidates for sDCI and DCI formats per subframe over the PDCCH candidates.

In some embodiments, a sDCI may be mapped onto the same search space of a DCI format on a PDCCH. In such embodiments, an indicator (e.g., a value of 0) may be appended to the sDCI format until the payload size is equal to that of the DCI format to, for example, avoid additional BDAs from UE 101. To differentiate with a normal DCI format, a dedicated Radio Network Temporary Identifier (RNTI) may be assigned to UE 101 and may be used to scramble the sDCI format cyclic redundancy check (CRC). In some embodiments, the UE-specific search space for sDCI (e.g., portion 1110 of FIG. 11) may be determined based on the dedicated RNTI assigned to UE 101 for sTTI operations. Additionally, or alternatively, the number of ALs and the number of PDCCH candidates per AL may be configured by RRC signaling In some embodiments, a single parameter PDCCH-candidateReduction may be configured by higher layers (e.g., RRC signaling) and applied to UE-specific search spaces (e.g., (e.g., portions 1110 and 1120 of FIG. 11) commonly for sDCI and DCI format monitoring by UE 101. In some embodiments, the PDCCH-candidateReduction may be 0.6 and/or may be configured by higher layers (e.g., RRC signaling) for AL1. Additionally, or alternatively, there may be 6 PDCCH candidates in a combination of UE-specific search spaces (e.g., portions 1110 and 1120 of FIG. 11). In such embodiments, one UE-specific search space (e.g., portion 1110 of FIG. 11) may be determined to consist of first [0.6×6]=4 PDCCH candidates, and another UE-specific search space (e.g., portion 1120 of FIG. 11) may be determined to consist of a remainder of the 6 PDCCH candidates (i.e., 2 PDCCH candidates) for a given AL (e.g., AL 1). Moreover, the number of total PDCCH candidates in a UE-specific search space (e.g., portion 1110 of FIG. 11) of a PDCCH region for sDCI monitoring may be less than that in other sTTIs of the same subframe in order to, for example, ensure that the total number of BDs per sTTI per CC are the same across all sTTIs of the subframe.

As described herein, system bandwidth (e.g., bandwidth used by UE 101 and/or RAN node 111) may be divided into multiple shortened resource block groups (sRBG) where a sRBG may be a set of consecutive resource blocks (RBs). sRBGs may be increased by a factor of N compared to the RBG size of legacy normal TTI operation (e.g., 1 ms) to, for example, limit the number of resource allocation field bits in a sDCI. In some embodiments, sDCIs for different UEs 101 of the same sRBG may be multiplexed to, for example, improve the efficiency with which sTTI may be implemented. The techniques, described herein, may include dynamic resource sharing mechanisms to, for example, aid and/or enable UE 101 to accurately utilize unused RBs in the reserved sPDCCH RB sets (e.g., sRBGs) to decode PDSCH transmissions.

Figure 12:
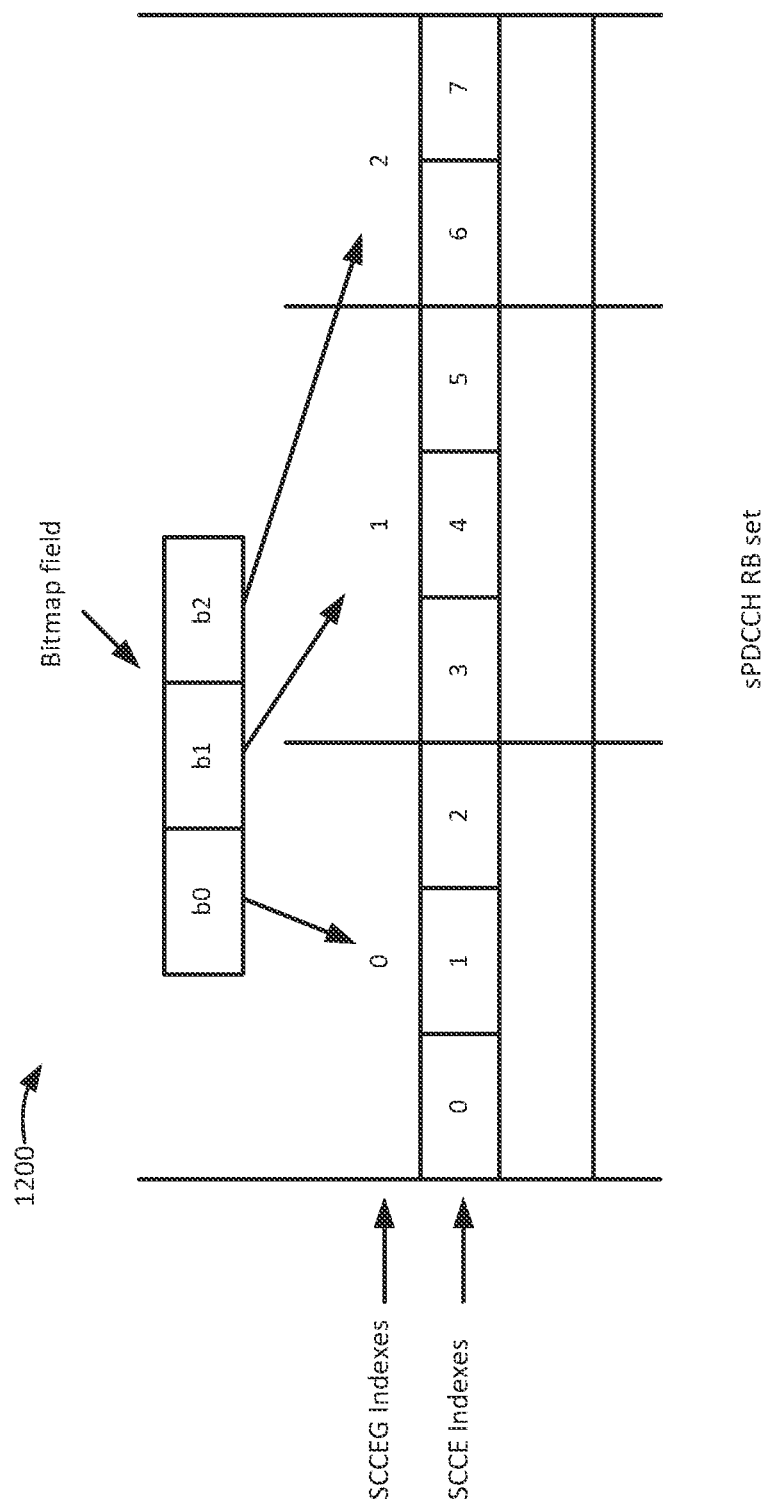
FIG. 12 is a diagram of an example for dynamic resource sharing of a shortened physical downlink control channel (sPDCCH) resource block (RB) set.

FIG. 12 is a diagram of an example 1200 for dynamic resource sharing of a sPDCCH RB set. As shown, the sPDCCH RB set may include 8 sCCEs that are indexed from 0-7 (in which case $N_{sCCE}=8$). The sCCEs may be arranged in 3 different sCCEGs that are indexed from 0-3. Furthermore, each sCCEG may correspond to a bitmap field (e.g., of a particular sDCI format) that includes three bitmap values (b0, b1, and b2) that correspond to different sCCEG indexes.

Assume that a first UE 101 uses sCCEs 0 for sPDCCH transmission, and a second UE 101 uses sCCEs 4 and 5 for sPDCCH transmission, then the bitmap field for scheduling sPDSCH of the first UE 101 (e.g., b0) may be set to (1, 1, 0) (where "1" indicates a sCCG in use and "0" indicates a sCCEG not in use) to indicate that sCCEGs 0 and 1 are used for PDCCH; however, sCCEG 2 is not being used for PDCCH. As such, the first UE 101 may become aware that sCCEG 2 may be used for sPDSCH if the assigned resources of the sPDSCH for the first UE 101 overlaps with the sPDCCH RB set.

In some embodiments, sCCEs formation may further take into account ALs of sPDCCH. For example, a set of sCCEG patterns, and corresponding sCCEs, may be defined based on the location and/or the AL of the sDCI that is detected by UE. Additionally, or alternatively, an sCCEG may include a multiple of a "basic unit" sCCEG (e.g., a basic unit sCCEG may consist of two consecutive sCCEs). For example, three sCCEGs may be formed with respective sCCEGs consisting of sCCEs (0, 1, 2, 3), (4, 5), and (6, 7) to, for example, improve resource efficiency. In some embodiments, a one-to-one mapping may be generated to associate between states indicated by the bitmap field in sDCI and the pre-defined sCCEG patterns.

In some embodiments, one or more sPDCCH PRB sets may be allocated to UE 101 for sPDCCH monitoring, which may consist of a set of logical sCCEs numbered from 0 to $N_{sCCE}-1$, where $N_{sCCE}$ may be the number of sCCEs in a sPDCCH resource set and each sPDCCH RB set may be configured as contiguous or non-contiguous PRBs. In such embodiments, the sCCEs may be logically grouped into a set of sCCE groups (sCCEGs). Additionally, or alternatively, UE 101 and/or RAN node 111 may determine the total number of sCCE groups r, for one or more sPDCCH PRB set, according to the following equations:

$$r = \lceil N_{sCCE}/B \rceil$$

$$K_x = B, 0 \le x \le \lfloor N_{sCCE}/B \rfloor$$

$$K_{r-1} = N_{sCCE} - B \cdot \lfloor N_{sCCE}/B \rfloor$$

Where $K_x$ is the number of sCCEs for a sCCEG x in the sPDCCH PRB set, and B may be predefined value (e.g., a value defined by the 3GPP Communication Standard). Additionally, or alternatively, B may be a function of the system bandwidth (e.g., the bandwidth available to UE 101 and/or RAN node 111) or alternatively, B may be configured by higher layers on a per-UE basis (e.g., by UE-specific RRC signaling).

Alternatively, in some embodiments, RAN node 111 may be use the following procedure to distribute the number of sCCEs into each sCCEG as equally as possible. There may be $N_+ = N_{sCCE}$ mod B sCCEGs with each consisting of $C_+ = \lceil N_{sCCE}/r \rceil$ sCCEs. While, there may be $C_- = r - C_+$ sCCEGs consisting of $\lfloor N_{sCCE}/r \rfloor$ sCCEs. In some embodiments, $N_{sCCE}$ may be used to count the sCCEs excluding the sCCE(s) that have been detected by a given UE 101 for a sPDCCH transmission.

In some embodiments, the $N_{sCCE}$ may count the sCCEs excluding the sCCE(s) that has been detected by a given UE for sPDCCH transmission.

Further, in the sDCI for sRBG-based sPDSCH resource allocation, resource block sharing information includes a bitmap indicating the unused sCCEGs in the sPDCCH PRB set that may be allocated to the scheduled UE 101 for sPDSCH transmission. The bitmap is of size r bits with one bitmap bit per sCCEG such that each sCCEG, if not used for sPDCCH in a sTTI, may be addressable for sPDSCH transmission. The order of sCCEG to bitmap bit mapping is in such a way that sCCEG 0 to sCCEG r−1 may be mapped to most significant bit (MSB) to least significant bit (LSB) of the bitmap. The sCCEG may be allocated to the UE if the corresponding bit value in the bitmap is 1, the sCCEG may not be allocated to UE 101 otherwise.

Figure 13:
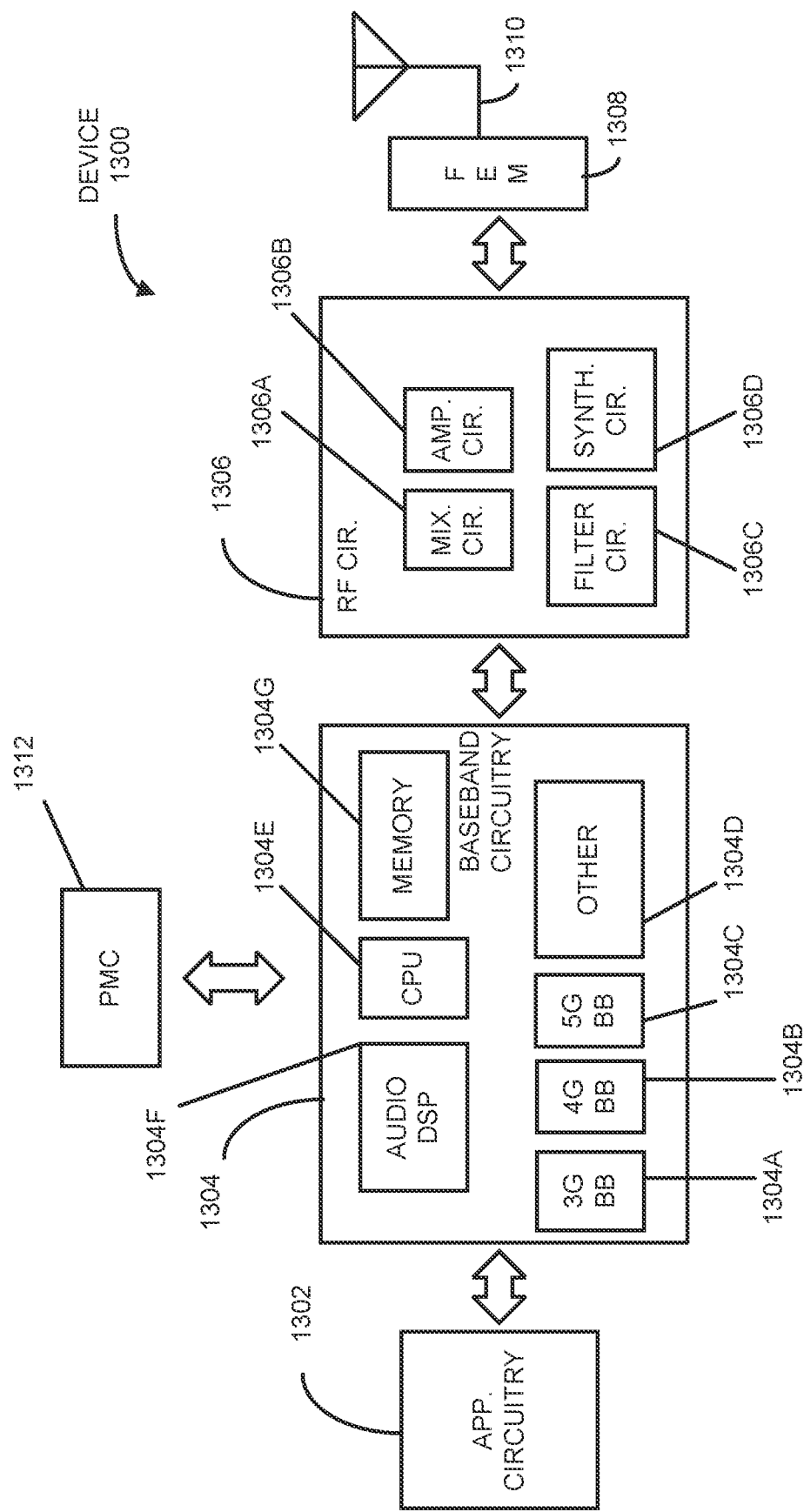
FIG. 13 is a block diagram of example components of a device in accordance with some embodiments.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306*a*, amplifier circuitry 1306*b* and filter circuitry 1306*c*. In some embodiments, the transmit signal path of the RF circuitry 1306 may include filter circuitry 1306*c* and mixer circuitry 1306*a*. RF circuitry 1306 may also include synthesizer circuitry 1306*d* for synthesizing a frequency for use by the mixer circuitry 1306*a* of the receive signal path and the transmit signal path. In some embodiments, the mixer circuitry 1306*a* of the receive signal path may be configured to down-convert RF signals received from the FEM circuitry 1308 based on the synthesized frequency provided by synthesizer circuitry 1306*d*. The amplifier circuitry 1306*b* may be configured to amplify the down-converted signals and the filter circuitry 1306*c* may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
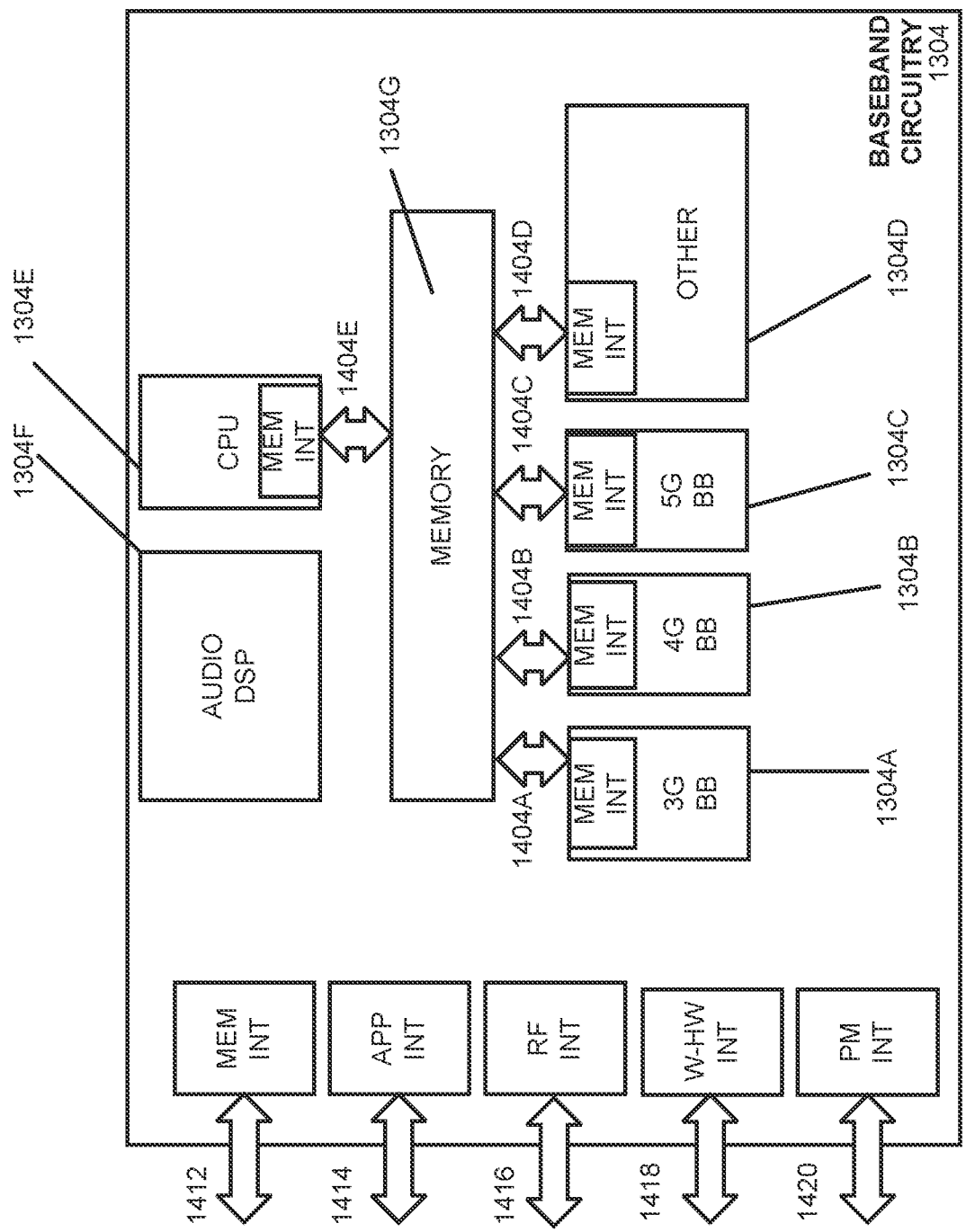
FIG. 14 is a block diagram of example interfaces of baseband circuitry in accordance with some embodiments.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
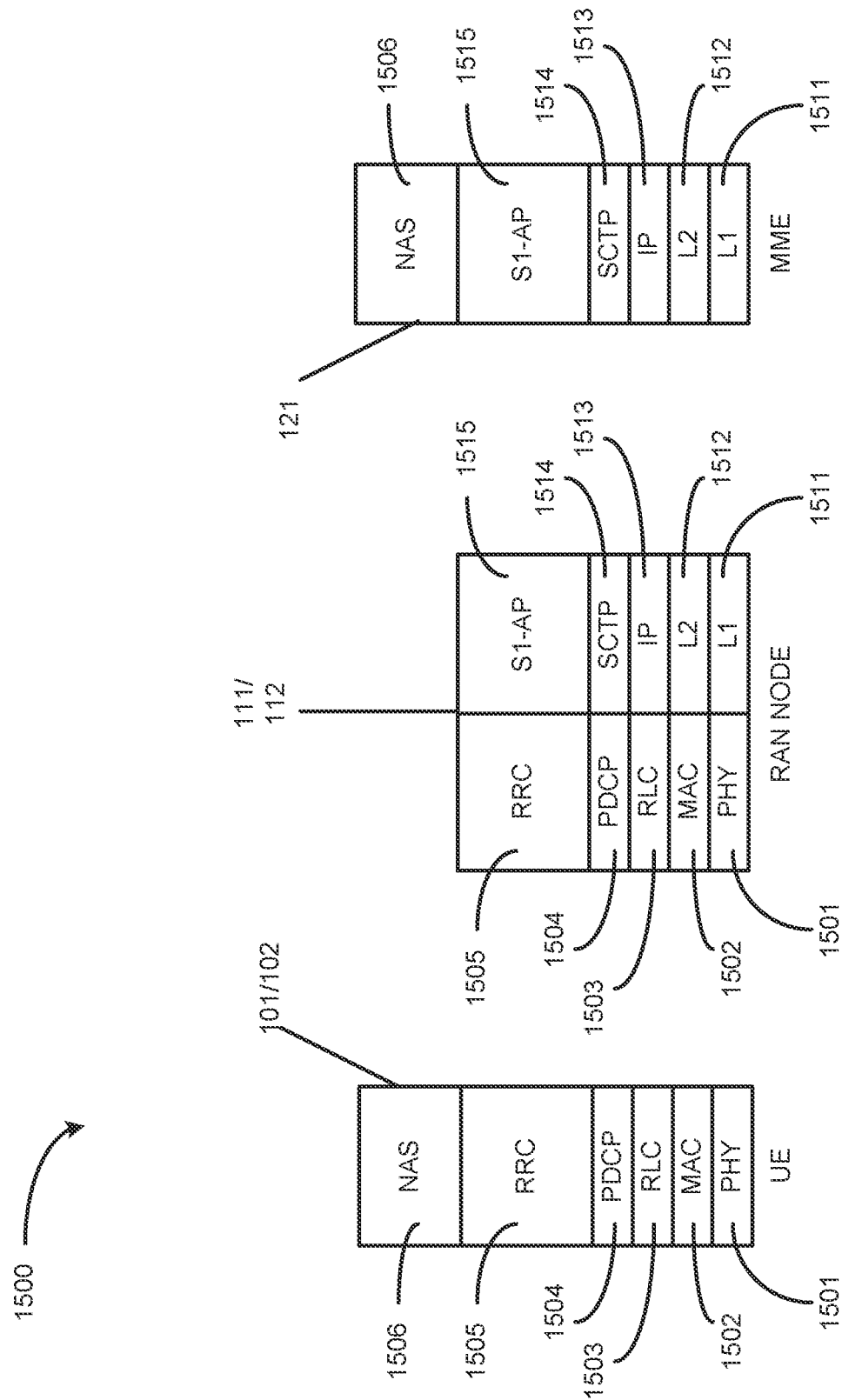
FIG. 15 is a block diagram of an example control plane protocol stack in accordance with some embodiments.

FIG. 15 is an illustration of a control plane protocol stack in accordance with some embodiments. In this embodiment, a control plane 1500 is shown as a communications protocol stack between the UE 101 (or alternatively, the UE 102), the RAN node 111 (or alternatively, the RAN node 112), and the MME 121.

The PHY layer 1501 may transmit or receive information used by the MAC layer 1502 over one or more air interfaces. The PHY layer 1501 may further perform link adaptation or adaptive modulation and coding (AMC), power control, cell search (e.g., for initial synchronization and handover purposes), and other measurements used by higher layers, such as the RRC layer 1505. The PHY layer 1501 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1502 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1503 may operate in a plurality of modes of operation, including: Transparent Mode (TM), Unacknowledged Mode (UM), and Acknowledged Mode (AM). The RLC layer 1503 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1503 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1505 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1501, the MAC layer 1502, the RLC layer 1503, the PDCP layer 1504, and the RRC layer 1505.

The non-access stratum (NAS) protocols 1506 form the highest stratum of the control plane between the UE 101 and the MME 121. The NAS protocols 1506 support the mobility of the UE 101 and the session management procedures to establish and maintain IP connectivity between the UE 101 and the P-GW 123.

The S1 Application Protocol (S1-AP) layer 1515 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1514 may ensure reliable delivery of signaling messages between the RAN node 111 and the MME 121 based, in part, on the IP protocol, supported by the IP layer 1513. The L2 layer 1512 and the L1 layer 1511 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1511, the L2 layer 1512, the IP layer 1513, the SCTP layer 1514, and the S1-AP layer 1515.

Figure 16:
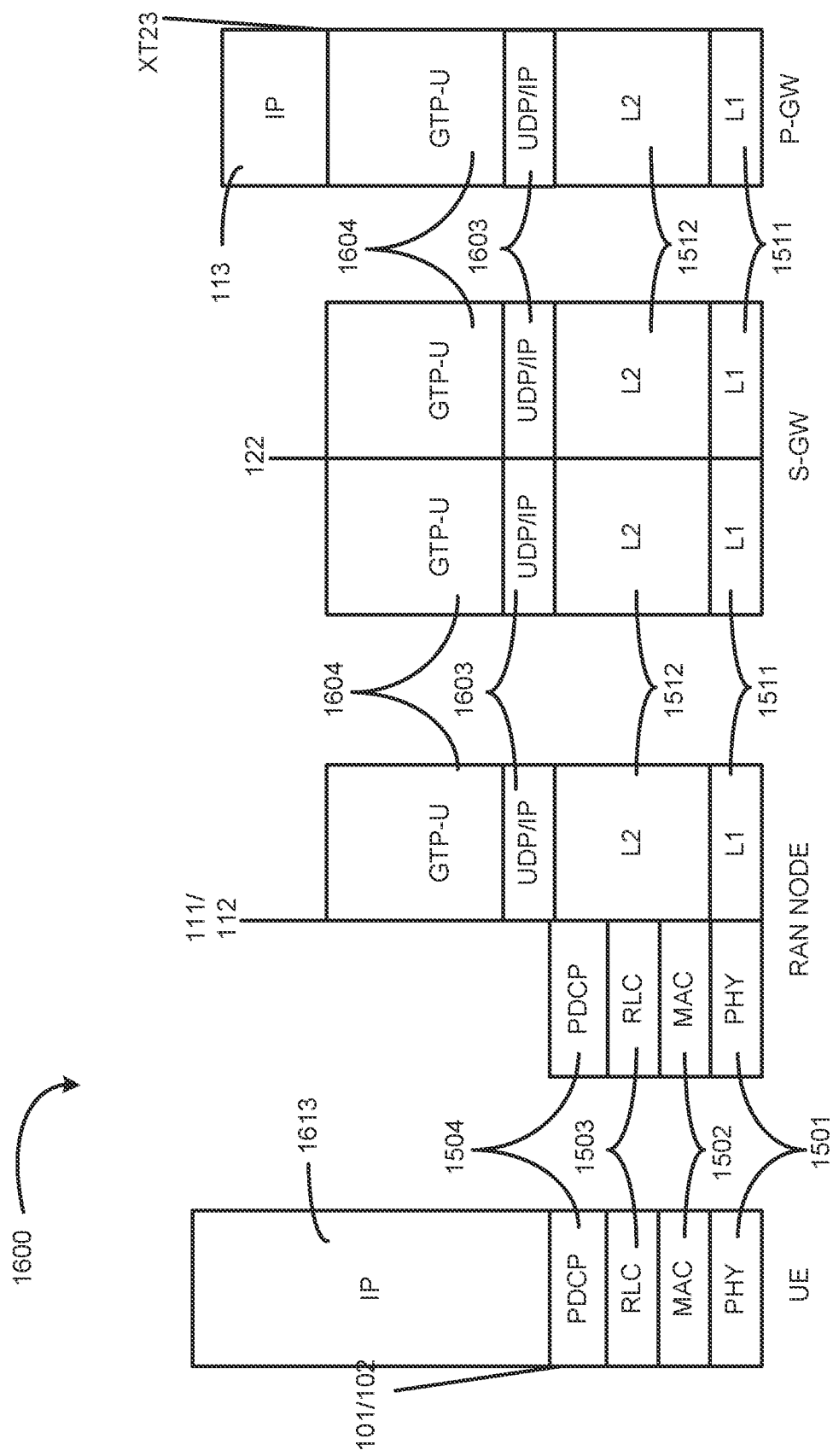
FIG. 16 is a block diagram of an example user plane protocol stack in accordance with some embodiments.

FIG. 16 is an illustration of a user plane protocol stack in accordance with some embodiments. In this embodiment, a user plane 1600 is shown as a communications protocol stack between the UE 101 (or alternatively, the UE 102), the RAN node 111 (or alternatively, the RAN node 112), the S-GW 122, and the P-GW 123. The user plane 1600 may utilize at least some of the same protocol layers as the control plane 1500. For example, the UE 101 and the RAN node 111 may utilize a Uu interface (e.g., an LTE-Uu interface) to exchange user plane data via a protocol stack comprising the PHY layer 1501, the MAC layer 1502, the RLC layer 1503, the PDCP layer 1504.

The General Packet Radio Service (GPRS) Tunneling Protocol for the user plane (GTP-U) layer 1604 may be used for carrying user data within the GPRS core network and between the radio access network and the core network. The user data transported can be packets in any of IPv4, IPv6, or PPP formats, for example. The UDP and IP security (UDP/IP) layer 1603 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1511, the L2 layer 1512, the UDP/IP layer 1603, and the GTP-U layer 1604. The S-GW 122 and the P-GW 123 may utilize an S5/S8a interface to exchange user plane data via a protocol stack comprising the L1 layer 1511, the L2 layer 1512, the UDP/IP layer 1603, and the GTP-U layer 1604. As discussed above with respect to FIG. 15, NAS protocols support the mobility of the UE 101 and the session management procedures to establish and maintain IP connectivity between the UE 101 and the P-GW 123.

Figure 17:
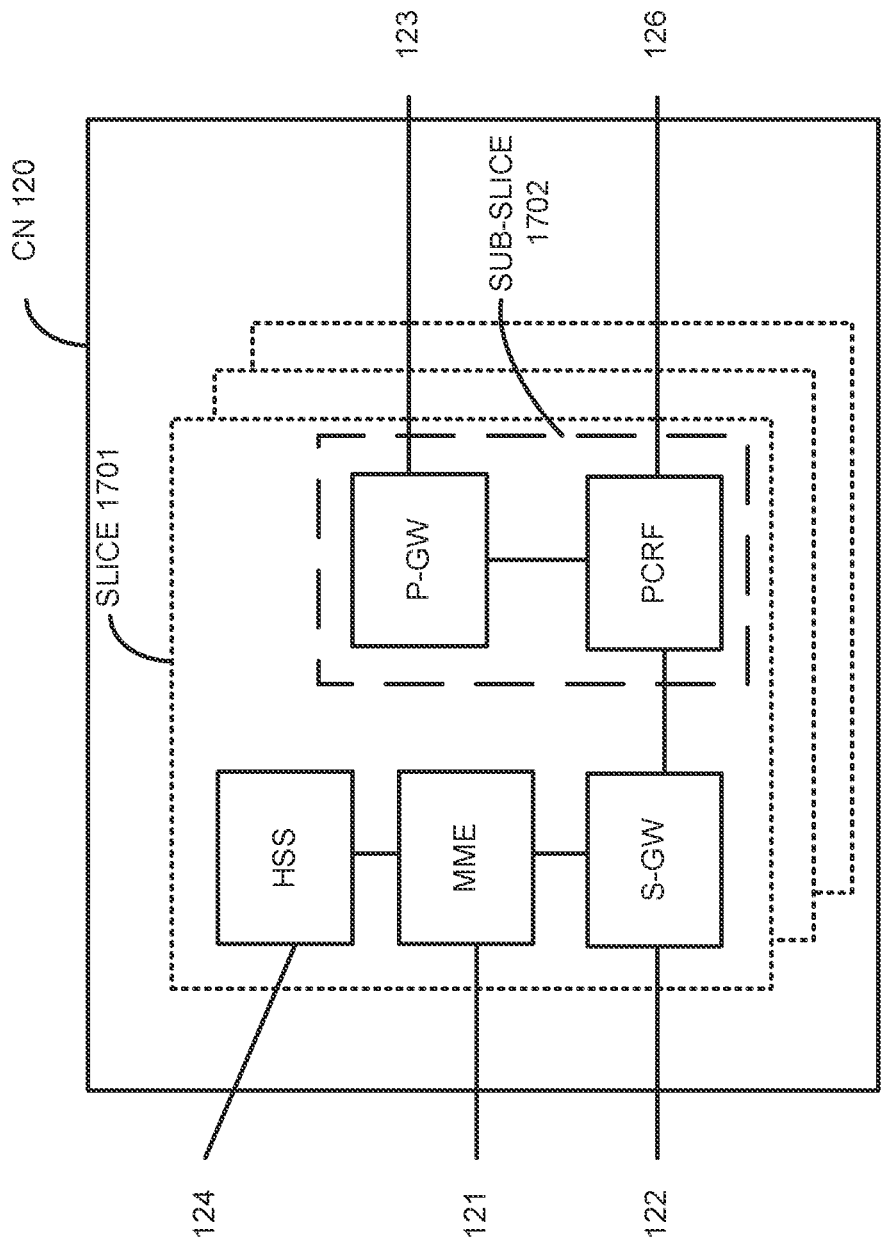
FIG. 17 illustrates components of a core network in accordance with some embodiments.

FIG. 17 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 1701. A logical instantiation of a portion of the CN 120 may be referred to as a network sub-slice 1702 (e.g., the network sub-slice 1702 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 18:
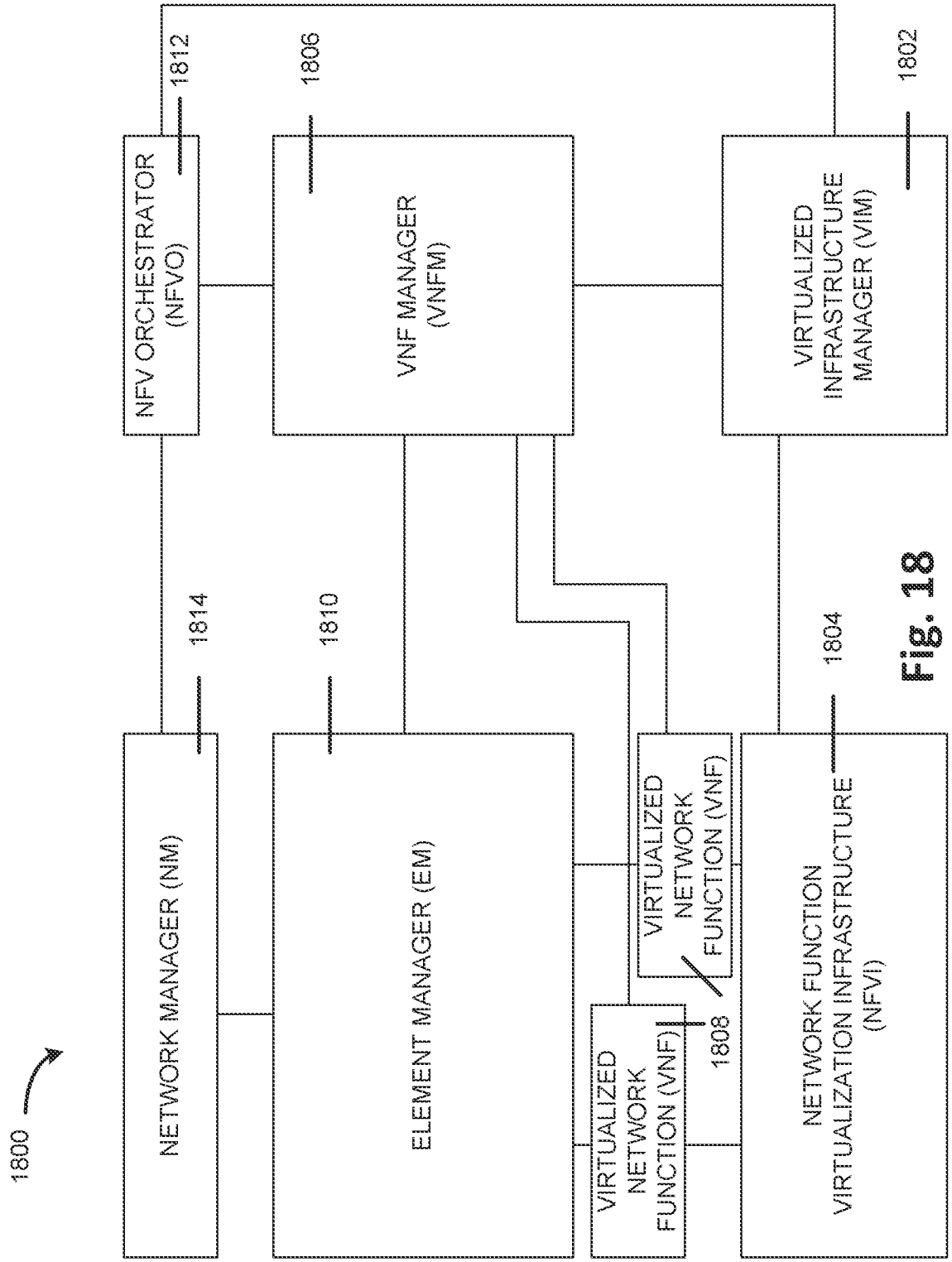
FIG. 18 is a block diagram illustrating components, according to some example embodiments, of a system to support Network Functions Virtualization (NFV)

FIG. 18 is a block diagram illustrating components, according to some example embodiments, of a system 1800 to support NFV. The system 1800 is illustrated as including a virtualized infrastructure manager (VIM) 1802, a network function virtualization infrastructure (NFVI) 1804, a VNF manager (VNFM) 1806, virtualized network functions (VNFs) 1808, an element manager (EM) 1810, an NFV Orchestrator (NFVO) 1812, and a network manager (NM) 1814.

The VIM 1802 manages the resources of the NFVI 1804. The NFVI 1804 can include physical or virtual resources and applications (including hypervisors) used to execute the system 1800. The VIM 1802 may manage the life cycle of virtual resources with the NFVI 1804 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1806 may manage the VNFs 1808. The VNFs 1808 may be used to execute EPC components/functions. The VNFM 1806 may manage the life cycle of the VNFs 1808 and track performance, fault and security of the virtual aspects of VNFs 1808. The EM 1810 may track the performance, fault and security of the functional aspects of VNFs 1808. The tracking data from the VNFM 1806 and the EM 1810 may comprise, for example, performance measurement (PM) data used by the VIM 1802 or the NFVI 1804. Both the VNFM 1806 and the EM 1810 can scale up/down the quantity of VNFs of the system 1800.

The NFVO 1812 may coordinate, authorize, release and engage resources of the NFVI 1804 in order to provide the requested service (e.g., to execute an EPC function, component, or slice). The NM 1814 may provide a package of end-user functions with the responsibility for the management of a network, which may include network elements with VNFs, non-virtualized network functions, or both (management of the VNFs may occur via the EM 1810).

Figure 19:
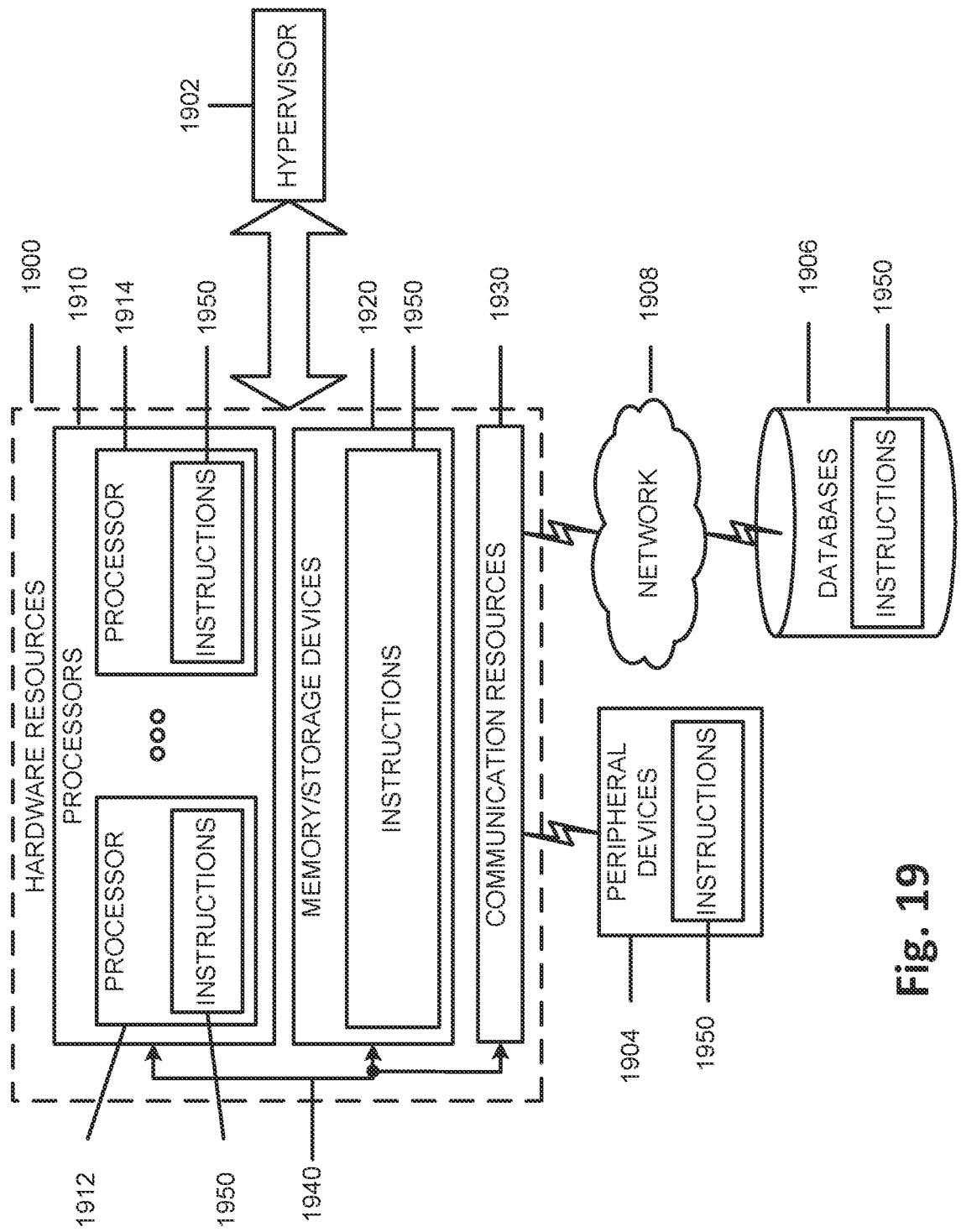
FIG. 19 is a block diagram of example components, according to some example embodiments, able to read instructions from a machine-readable or computer-readable medium (e.g., a non-transitory machine-readable storage medium) and perform any one or more of the methodologies discussed herein.

FIG. 19 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1900 including one or more processors (or processor cores) 1910, one or more memory/storage devices 1920, and one or more communication resources 1930, each of which may be communicatively coupled via a bus 1940. For embodiments where node virtualization (e.g., NFV) is utilized, a hypervisor 1902 may be executed to provide an execution environment for one or more network slices/sub-slices to utilize the hardware resources 1900

The processors 1910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1912 and a processor 1914.

The memory/storage devices 1920 may include main memory, disk storage, or any suitable combination thereof. The memory/storage devices 1920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1930 may include interconnection or network interface components or other suitable devices to communicate with one or more peripheral devices 1904 or one or more databases 1906 via a network 1908. For example, the communication resources 1930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1950 may comprise software, a program, an application, an applet, an app, or other executable code for causing at least any of the processors 1910 to perform any one or more of the methodologies discussed herein. The instructions 1950 may reside, completely or partially, within at least one of the processors 1910 (e.g., within the processor's cache memory), the memory/storage devices 1920, or any suitable combination thereof. Furthermore, any portion of the instructions 1950 may be transferred to the hardware resources 1900 from any combination of the peripheral devices 1904 or the databases 1906. Accordingly, the memory of processors 1910, the memory/storage devices 1920, the peripheral devices 1904, and the databases 1906 are examples of computer-readable and machine-readable media.

A number of examples, relating to embodiments of the techniques described above, will next be given.

In a first example, an apparatus of a User Equipment (UE) may comprise: an interface to radio frequency (RF) circuitry; and one or more processors that are controlled to: process information, received via the interface to RF circuitry, regarding a search space of a physical downlink control channel (PDCCH) for obtaining downlink control information (DCI) from a radio access network (RAN) node; determine, based on the DCI obtained from the RAN node, a slot format for communicating with the RAN node, wherein the slot format for a slot indicates symbols allocated for uplink (UL) communications, symbols allocated for downlink (DL) communications, and symbols identified as flexible symbols; and communicate, via the interface to the RF circuitry, with the RAN node in accordance with the slot format.

In example 2, the subject matter of example 1, or any of the examples herein, wherein a slot format indicator (SFI) monitoring configuration is received via high layer signaling.

In example 3, the subject matter of example 1, or any of the examples herein, wherein, to determine the slot format, the one or more processors are controlled to: receive, via the interface to RF circuitry, a plurality of slot formats that includes the slot format; and map a SFI index field value, corresponding to a DCI format of the DCI, to the slot format of the plurality of slot formats.

In example 4, the subject matter of example 1, or any of the examples herein, wherein the one or more processors are further controlled to: determine, based on higher layer signaling from the RAN node and the PDCCH carrying the DCI format with the SFI, slot format information for one or more consecutive slots.

In example 5, the subject matter of example 1, or any of the examples herein, wherein the one or more processors are further controlled to: determine, based on higher layer signaling from the RAN node, a serving cell to which the slot format corresponds.

In example 6, the subject matter of example 1, or any of the examples herein, wherein the search space corresponds to a bandwidth part (BWP) of a plurality of (BWPs) for communications between the UE and the RAN node.

In example 7, the subject matter of example 1, or any of the examples herein, wherein the one or more processors are further controlled to: determine a slot format for another BWP, of the plurality of BWPs, based on the determined slot format of the BWP, a subcarrier spacing (SCS) of the BWP, and a SCS of the another BWP.

In an eighth example, an apparatus of a User Equipment (UE) may comprise: an interface to radio frequency (RF) circuitry; and one or more processors that are controlled to: causing UE capability information to be communicated, via the interface to the RF circuitry, to a radio access network (RAN) node, regarding a maximum number of blind decode attempts (BDAs) supported by the UE; determine, based on the maximum BDAs, shortened channel control elements (sCCEs) to be used, by the RAN node, to transmit shortened downlink control information (sDCI) via a shortened physical downlink control channel (sPDCCH); and obtain sDCI by monitoring the sPDCCH in accordance with the determined sCCEs.

In example 9, the subject matter of example 8, or any of the examples herein, wherein the one or more processors that are further controlled to: communicate, via the interface to the RF, with the RAN node in accordance with the sDCI.

In example 10, the subject matter of example 8, or any of the examples herein, wherein the number of blind decodes corresponds to a UE-specific search space of a subframe.

In example 11, the subject matter of example 8, or any of the examples herein, wherein the maximum number of BDAs is provided via a field of a radio resource control (RRC) information element (IE) in a reference window.

In example 12, the subject matter of example 8, or any of the examples herein, wherein the sDCI indicates at least one sCCEs, of a sPDCCH resource block (RB) set corresponding to the determined sCCEs, that are to be used to transmit information via a physical downlink shared channel (PDSCH).

In example 13, the subject matter of example 8, or any of the examples herein, wherein the sCCEs of the sPDCCH is based, at least in part, on determining sCCEs of a sPDCCH candidate, of a plurality of sPDCCH candidates, at an aggregation level (AL) of the UE.

In example 14, the subject matter of example 8, or any of the examples herein, wherein the plurality of sPDCCH candidates at the AL correspond to a particular DCI format.

In example 15, the subject matter of example 8, or any of the examples herein, wherein the plurality of sPDCCH candidates is provided to the UE via high layer signaling.

In example 16, the subject matter of example 8, or any of the examples herein, wherein the DCI format is provided to the UE via high layer signaling.

In example 17, the subject matter of example 8, or any of the examples herein, wherein the search space for the sDCI in the PDCCH includes a subset of a search space of the PDCCH for DCI format monitoring.

In example 18, the subject matter of example 8, or any of the examples herein, wherein the search space of the PDCCH for DCI format monitoring includes a portion for sDCI monitoring and another portion for DCI format monitoring.

In example 19, the subject matter of example 8, or any of the examples herein, wherein: the sCCEs of a sPDCCH RB set are arranged in a set of sCCE groups (sCCEG); and resource block sharing information, in the sDCI, includes a bitmap indicating an unused sCCEG, in the sPDCCH PRB set, for sPDSCH transmission.

In a twentieth example, a computer-readable medium may contain program instructions for causing one or more processors, associated with a User Equipment (UE), to: process information, received from a radio access network (RAN) node, regarding a search space of a physical downlink control channel (PDCCH) for obtaining downlink control information (DCI) from the RAN node; determine, based on the DCI obtained from the RAN node, a slot format for communicating with the RAN node, wherein the slot format indicates, for a slot, whether a corresponding symbol is allocated for uplink (UL) communications, downlink (DL) communications, or identified as a flexible symbol; and communicate with the RAN node in accordance with the slot format.

In example 21, the subject matter of example 20, or any of the examples herein, wherein a slot format indicator (SFI) monitoring configuration is received via high layer signaling.

In example 22, the subject matter of example 20, or any of the examples herein, wherein, to determine the slot format, the one or more processors are to: receive a plurality of slot formats that includes the slot format; and map a SFI index field value, corresponding to a DCI format of the DCI, to the slot format of the plurality of slot formats.

In example 23, the subject matter of example 20, or any of the examples herein, wherein the one or more processors are further to: determine, based on higher layer signaling from the RAN node and the PDCCH carrying the DCI format with the SFI, slot format information for one or more consecutive slots.

In example 24, the subject matter of example 20, or any of the examples herein, wherein the one or more processors are further to: determine, based on higher layer signaling from the RAN node, a serving cell to which the slot format corresponds.

In example 25, the subject matter of example 20, or any of the examples herein, wherein the search space corresponds to a bandwidth part (BWP) of a plurality of (BWPs) used for communications between the UE and the RAN node.

In example 26, the subject matter of example 20, or any of the examples herein, wherein the one or more processors are further to: determine a slot format for another BWP, of the plurality of BWPs, based on the determined slot format of the BWP, a subcarrier spacing (SCS) of the BWP, and a SCS of the another BWP.

In a twenty-seventh example, a computer-readable medium may contain program instructions for causing one or more processors, associated with a User Equipment (UE), to: cause UE capability information to be communicated to a radio access network (RAN) node, regarding a maximum number of blind decode attempts (BDAs) supported by the UE; determine, based on the maximum BDAs, shortened channel control elements (sCCEs) to be used, by the RAN node, to transmit shortened downlink control information (sDCI) via a shortened physical downlink control channel (sPDCCH); and obtain sDCI by monitoring the sPDCCH in accordance with the determined sCCEs.

In example 28, the subject matter of example 27, or any of the examples herein, wherein the one or more processors that are further to: communicate with the RAN node in accordance with the sDCI.

In example 29, the subject matter of example 27, or any of the examples herein, wherein the number of blind decodes corresponds to a UE-specific search space of a subframe.

In example 30, the subject matter of example 27, or any of the examples herein, wherein the maximum number of BDAs is provided via a field of a radio resource control (RRC) information element (IE) in a reference window.

In example 31, the subject matter of example 27, or any of the examples herein, wherein the sDCI indicates at least one sCCEs, of a sPDCCH resource block (RB) set corresponding to the determined sCCEs, that are to be used to transmit information via a physical downlink shared channel (PDSCH).

In example 32, the subject matter of example 27, or any of the examples herein, wherein the sCCEs of the sPDCCH is based, at least in part, on determining sCCEs of a sPDCCH candidate, of a plurality of sPDCCH candidates, at an aggregation level (AL) of the UE.

In example 33, the subject matter of example 27, or any of the examples herein, wherein the plurality of sPDCCH candidates at the AL correspond to a particular DCI format.

In example 34, the subject matter of example 27, or any of the examples herein, wherein the plurality of sPDCCH candidates is provided to the UE via high layer signaling.

In example 35, the subject matter of example 27, or any of the examples herein, wherein the DCI format is provided to the UE via high layer signaling.

In example 36, the subject matter of example 27, or any of the examples herein, wherein the search space for the sDCI in the PDCCH includes a subset of a search space of the PDCCH for DCI format monitoring.

In example 37, the subject matter of example 27, or any of the examples herein, wherein the search space of the PDCCH for DCI format monitoring includes a portion for sDCI monitoring and another portion for DCI format monitoring.

In example 38, the subject matter of example 27, or any of the examples herein, wherein: the sCCEs of a sPDCCH RB set are arranged in a set of sCCE groups (sCCEG); and resource block sharing information, in the sDCI, includes a bitmap indicating an unused sCCEG, in the sPDCCH PRB set, for sPDSCH transmission.

In a thirty-ninth example, an apparatus of a User Equipment (UE) may comprise: means for processing information, received from a radio access network (RAN) node, regarding a search space of a physical downlink control channel (PDCCH) for obtaining downlink control information (DCI) from the RAN node; means for determining, based on the DCI obtained from the RAN node, a slot format for communicating with the RAN node, wherein the slot format indicates, for a slot, whether a corresponding symbol is allocated for uplink (UL) communications, downlink (DL) communications, or identified as a flexible symbol; and means for communicating with the RAN node in accordance with the slot format.

In example 40, the subject matter of example 39, or any of the examples herein, wherein a slot format indicator (SFI) monitoring configuration is received via high layer signaling.

In example 41, the subject matter of example 39, or any of the examples herein, wherein, the means for determining the slot format includes: means for receiving a plurality of slot formats that includes the slot format; and means for mapping a SFI index field value, corresponding to a DCI format of the DCI, to the slot format of the plurality of slot formats.

In example 42, the subject matter of example 39, or any of the examples herein, further comprising: means for determining, based on higher layer signaling from the RAN node and the PDCCH carrying the DCI format with the SFI, slot format information for one or more consecutive slots.

In example 43, the subject matter of example 39, or any of the examples herein, further comprising: means for determining, based on higher layer signaling from the RAN node, a serving cell to which the slot format corresponds.

In example 44, the subject matter of example 39, or any of the examples herein, wherein the search space corresponds to a bandwidth part (BWP) of a plurality of (BWPs) for communications between the UE and the RAN node.

In example 45, the subject matter of example 39, or any of the examples herein, further comprising: means for determining a slot format for another BWP, of the plurality of BWPs, based on the determined slot format of the BWP, a subcarrier spacing (SCS) of the BWP, and a SCS of the another BWP.

In a forty-sixth example, an apparatus of a User Equipment (UE) may comprise: means for causing UE capability information to be communicated to a radio access network (RAN) node, regarding a maximum number of blind decode attempts (BDAs) supported by the UE; means for determining, based on the maximum BDAs, shortened channel control elements (sCCEs) to be used, by the RAN node, to transmit shortened downlink control information (sDCI) via a shortened physical downlink control channel (sPDCCH); and means for obtaining sDCI by monitoring the sPDCCH in accordance with the determined sCCEs.

In example 47, the subject matter of example 46, or any of the examples herein, further comprising: means for communicating with the RAN node in accordance with the sDCI.

In example 48, the subject matter of example 46, or any of the examples herein, wherein the number of blind decodes corresponds to a UE-specific search space of a subframe.

In example 49, the subject matter of example 46, or any of the examples herein, wherein the maximum number of BDAs is provided via a field of a radio resource control (RRC) information element (IE) in a reference window.

In example 50, the subject matter of example 46, or any of the examples herein, wherein the sDCI indicates at least one sCCEs, of a sPDCCH resource block (RB) set corresponding to the determined sCCEs, that are to be used to transmit information via a physical downlink shared channel (PDSCH).

In example 51, the subject matter of example 46, or any of the examples herein, wherein the sCCEs of the sPDCCH is based, at least in part, on determining sCCEs of a sPDCCH candidate, of a plurality of sPDCCH candidates, at an aggregation level (AL) of the UE.

In example 52, the subject matter of example 46, or any of the examples herein, wherein the plurality of sPDCCH candidates at the AL correspond to a particular DCI format.

In example 53, the subject matter of example 46, or any of the examples herein, wherein the plurality of sPDCCH candidates is provided to the UE via high layer signaling.

In example 54, the subject matter of example 46, or any of the examples herein, wherein the DCI format is provided to the UE via high layer signaling.

In example 55, the subject matter of example 46, or any of the examples herein, wherein the search space for the sDCI in the PDCCH includes a subset of a search space of the PDCCH for DCI format monitoring.

In example 56, the subject matter of example 46, or any of the examples herein, wherein the search space of the PDCCH for DCI format monitoring includes a portion for sDCI monitoring and another portion for DCI format monitoring.

In example 57, the subject matter of example 46, or any of the examples herein, wherein: the sCCEs of a sPDCCH RB set are arranged in a set of sCCE groups (sCCEG); and resource block sharing information, in the sDCI, includes a bitmap indicating an unused sCCEG, in the sPDCCH PRB set, for sPDSCH transmission.

In a fifty-eighth example, a method, performed by a User Equipment (UE) may comprise: processing information, received from a radio access network (RAN) node, regarding a search space of a physical downlink control channel (PDCCH) for obtaining downlink control information (DCI) from the RAN node; determining, based on the DCI obtained from the RAN node, a slot format for communicating with the RAN node, wherein the slot format indicates, for a slot, whether a corresponding symbol is allocated for uplink (UL) communications, downlink (DL) communications, or identified as a flexible symbol; and communicating with the RAN node in accordance with the slot format.

In example 59, the subject matter of example 58, or any of the examples herein, wherein a slot format indicator (SFI) monitoring configuration is received via high layer signaling.

In example 60, the subject matter of example 58, or any of the examples herein, wherein, the means for determining the slot format includes: receiving a plurality of slot formats that includes the slot format; and mapping a SFI index field value, corresponding to a DCI format of the DCI, to the slot format of the plurality of slot formats.

In example 61, the subject matter of example 58, or any of the examples herein, further comprising: determining, based on higher layer signaling from the RAN node and the PDCCH carrying the DCI format with the SFI, slot format information for one or more consecutive slots.

In example 62, the subject matter of example 58, or any of the examples herein, further comprising: determining, based on higher layer signaling from the RAN node, a serving cell to which the slot format corresponds.

In example 63, the subject matter of example 58, or any of the examples herein, wherein the search space corresponds to a bandwidth part (BWP) of a plurality of (BWPs) for communications between the UE and the RAN node.

In example 64, the subject matter of example 58, or any of the examples herein, further comprising: determining a slot format for another BWP, of the plurality of BWPs, based on the determined slot format of the BWP, a subcarrier spacing (SCS) of the BWP, and a SCS of the another BWP.

In sixty-fifth example, a method, performed by a User Equipment (UE) may comprise: causing UE capability information to be communicated to a radio access network (RAN) node, regarding a maximum number of blind decode attempts (BDAs) supported by the UE; determining, based on the maximum BDAs, shortened channel control elements (sCCEs) to be used, by the RAN node, to transmit shortened downlink control information (sDCI) via a shortened physical downlink control channel (sPDCCH); and obtaining sDCI by monitoring the sPDCCH in accordance with the determined sCCEs.

In example 66, the subject matter of example 65, or any of the examples herein, further comprising: means for communicating with the RAN node in accordance with the sDCI.

In example 67, the subject matter of example 65, or any of the examples herein, wherein the number of blind decodes corresponds to a UE-specific search space of a subframe.

In example 68, the subject matter of example 65, or any of the examples herein, wherein the maximum number of BDAs is provided via a field of a radio resource control (RRC) information element (IE) in a reference window.

In example 69, the subject matter of example 65, or any of the examples herein, wherein the sDCI indicates at least one sCCEs, of a sPDCCH resource block (RB) set corresponding to the determined sCCEs, that are to be used to transmit information via a physical downlink shared channel (PDSCH).

In example 70, the subject matter of example 65, or any of the examples herein, wherein the sCCEs of the sPDCCH is based, at least in part, on determining sCCEs of a sPDCCH candidate, of a plurality of sPDCCH candidates, at an aggregation level (AL) of the UE.

In example 71, the subject matter of example 65, or any of the examples herein, wherein the plurality of sPDCCH candidates at the AL correspond to a particular DCI format.

In example 72, the subject matter of example 65, or any of the examples herein, wherein the plurality of sPDCCH candidates is provided to the UE via high layer signaling.

In example 73, the subject matter of example 65, or any of the examples herein, wherein the DCI format is provided to the UE via high layer signaling.

In example 74, the subject matter of example 65, or any of the examples herein, wherein the search space for the sDCI in the PDCCH includes a subset of a search space of the PDCCH for DCI format monitoring.

In example 75, the subject matter of example 65, or any of the examples herein, wherein the search space of the PDCCH for DCI format monitoring includes a portion for sDCI monitoring and another portion for DCI format monitoring.

In example 76, the subject matter of example 65, or any of the examples herein, wherein: the sCCEs of a sPDCCH RB set are arranged in a set of sCCE groups (sCCEG); and resource block sharing information, in the sDCI, includes a bitmap indicating an unused sCCEG, in the sPDCCH PRB set, for sPDSCH transmission.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2-7 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus comprising one or more processors that are configured to:
    cause UE capability information to be communicated, to a radio access network (RAN) node, regarding a maximum number of blind decode attempts (BDAs) supported by a User Equipment (UE);
    determine, based on the maximum number of BDAs, shortened channel control elements (sCCEs) to be used, by the RAN node, to transmit shortened downlink control information (sDCI) via a shortened physical downlink control channel (sPDCCH); and
    obtain the sDCI by monitoring the sPDCCH in accordance with the determined sCCEs.

2. The apparatus of claim 1, wherein the one or more processors are further configured to
    cause communication with the RAN node in accordance with the sDCI.

3. The apparatus of claim 1, wherein the maximum number of BDAs corresponds to a UE-specific search space of a subframe.

4. The apparatus of claim 1, wherein the maximum number of BDAs is provided via a field of a radio resource control (RRC) information element (IE) in a reference window.

5. The apparatus of claim 1, wherein the sDCI indicates at least one sCCE, of a sPDCCH physical resource block (PRB) set corresponding to the determined sCCEs, that is to be used to transmit information via a physical downlink shared channel (PDSCH).

6. The apparatus of claim 1, wherein sCCEs of the sPDCCH are determined based, at least in part, on determining sCCEs of a sPDCCH candidate, of a plurality of sPDCCH candidates, at an aggregation level (AL).

7. The apparatus of claim 6, wherein the plurality of sPDCCH candidates at the AL correspond to a particular DCI format.

8. The apparatus of claim 7, wherein the plurality of sPDCCH candidates is provided to the UE via high layer signaling.

9. The apparatus of claim 7, wherein the particular DCI format is provided via high layer signaling.

10. The apparatus of claim 1, wherein a search space for the sDCI in the sPDCCH includes a subset of a search space of a PDCCH for DCI format monitoring.

11. The apparatus of claim 10, wherein the search space of the PDCCH for DCI format monitoring includes a portion for sDCI monitoring and another portion for DCI format monitoring.

12. The apparatus of claim 1, wherein
sCCEs of a sPDCCH physical resource block (PRB) set are arranged in a set of sCCE groups (sCCEG); and
resource block sharing information, in the sDCI, includes a bitmap indicating an unused sCCEG, in the sPDCCH PRB set, for sPDSCH transmission.

13. A method for a User Equipment (UE), comprising:
causing UE capability information to be communicated to a radio access network (RAN) node, regarding a maximum number of blind decode attempts (BDAs) supported by the UE;
determining, based on the maximum number of BDAs, shortened channel control elements (sCCEs) to be used, by the RAN node, to transmit shortened downlink control information (sDCI) via a shortened physical downlink control channel (sPDCCH); and
obtaining the sDCI by monitoring the sPDCCH in accordance with the determined sCCEs.

14. The method of claim 13, further comprising communicating with the RAN node in accordance with the sDCI.

15. The method of claim 13, wherein the maximum number of BDAs corresponds to a UE-specific search space of a subframe.

16. A method for a base station (BS), comprising:
receiving, from a user equipment (UE), capability information regarding a maximum number of blind decode attempts (BDAs) supported by the UE;
determining, based on the maximum number of BDAs, shortened channel control elements (sCCEs) to be used to transmit shortened downlink control information (sDCI) via a shortened physical downlink control channel (sPDCCH); and
transmitting sDCI via the sPDCCH in accordance with the determined sCCEs without identifying the determined sCCEs to the UE.

17. The method of claim 16, wherein the maximum number of BDAs corresponds to a UE-specific search space of a subframe.

18. The method of claim 16, wherein sCCEs of the sPDCCH are determined based, at least in part, on determining sCCEs of a sPDCCH candidate, of a plurality of sPDCCH candidates, at an aggregation level (AL) of the UE.

19. The method of claim 16, wherein a search space for the sDCI in the sPDCCH includes a subset of a search space of a PDCCH for DCI format monitoring.

20. The method of claim 16, wherein
sCCEs of a sPDCCH physical resource block (PRB) set are arranged in a set of sCCE groups (sCCEG); and
resource block sharing information, in the sDCI, includes a bitmap indicating an unused sCCEG, in the sPDCCH PRB set, for sPDSCH transmission.

* * * * *